US008225609B2

(12) United States Patent
Hinderling

(10) Patent No.: US 8,225,609 B2
(45) Date of Patent: *Jul. 24, 2012

(54) STEAM STORAGE SYSTEM FOR ARTIFICIAL SOLAR ISLAND

(75) Inventor: Thomas Hinderling, Zurich (CH)

(73) Assignee: Nolaris SA, Neuchatel (CH)

( * ) Notice: Subject to any disclaimer, the term of this patent is extended or adjusted under 35 U.S.C. 154(b) by 92 days.

This patent is subject to a terminal disclaimer.

(21) Appl. No.: 12/834,466

(22) Filed: Jul. 12, 2010

(65) Prior Publication Data

US 2010/0307153 A1    Dec. 9, 2010

Related U.S. Application Data

(63) Continuation of application No. PCT/IB2009/000223, filed on Feb. 6, 2009.

(60) Provisional application No. 61/027,248, filed on Feb. 8, 2008.

(51) Int. Cl.
*F03G 6/00* (2006.01)

(52) U.S. Cl. .................. 60/641.11; 60/641.8; 60/641.15

(58) Field of Classification Search ..... 60/641.8–641.15
See application file for complete search history.

(56) References Cited

U.S. PATENT DOCUMENTS 4,159,629 A * 7/1979 Korr et al. .................. 60/641.15

(Continued)

FOREIGN PATENT DOCUMENTS

DE         3541713        5/1987

(Continued)

OTHER PUBLICATIONS

European Patent Office, Form PCT/ ISA/220 Notification of Transmittal of the International Search Report and Written Opinion (1 pg.), Form PCT/ISA/210 International Search Report (3 pgs.), and PCT Form PCT/ISA/237 Written Opinion of The International Search Authority (6 pgs.) Mar. 18, 2011.

*Primary Examiner* — Hoang Nguyen
(74) *Attorney, Agent, or Firm* — Wood Herron & Evans, LLC

(57) ABSTRACT

A system [500] for producing solar energy at a desired temperature and pressure range includes a primary energy source [501] that is used in a Clausius Rankine cycle, with the primary energy source connected to and proximate to a plurality of solar collectors [520]. More particularly, at least one steam storage tank [501] feeds the expansion step of the Clausius Rankine cycle. This enables the system [500] to reliably supply energy during times when the solar collectors receive little or no radiation. According to one aspect of the invention, the solar collectors [520] reside on an artificial island [510a, 510b, 510c], preferably sea-based, or offshore, so that the steam storage tank [501a, 501b, 501c] can be located well below sea level. This enables the use of compressive forces from the sea water to counteract the outwardly directed pressure caused by the steam contained in the steam storage tank [501a, 501b, 501c]. Moreover, this storage tank [501c] may have a dual-walled structure [501d, 501e], for insulation purposes, and may be operatively connected to a sea level condenser [501i] to produce sweet water. Still further, steam from the steam storage tank [501] can be used to drive one or more absorption chiller devices housed within an absorption chiller unit [530a] that is operatively connected to an air conditioning system [530b]. And these structures can be located on the roof of a building [530] so as to supply air conditioning to the building [530].

17 Claims, 19 Drawing Sheets

U.S. PATENT DOCUMENTS

| | | | | |
|---|---|---|---|---|
| 4,462,213 A | * | 7/1984 | Lewis | 60/641.8 |
| 4,608,964 A | * | 9/1986 | Russo | 126/688 |
| 5,740,672 A | * | 4/1998 | Bronicki | 60/641.2 |
| 7,891,351 B2 | * | 2/2011 | Hinderling et al. | 126/605 |
| 8,056,554 B2 | * | 11/2011 | Hinderling | 126/628 |
| 2009/0223508 A1 | * | 9/2009 | Hinderling | 126/628 |
| 2010/0037887 A1 | * | 2/2010 | Hinderling | 126/600 |

FOREIGN PATENT DOCUMENTS

| | | |
|---|---|---|
| DE | 3619016 | 12/1987 |
| DE | 3934517 | 4/1991 |
| WO | 2007046855 | 4/2007 |

* cited by examiner

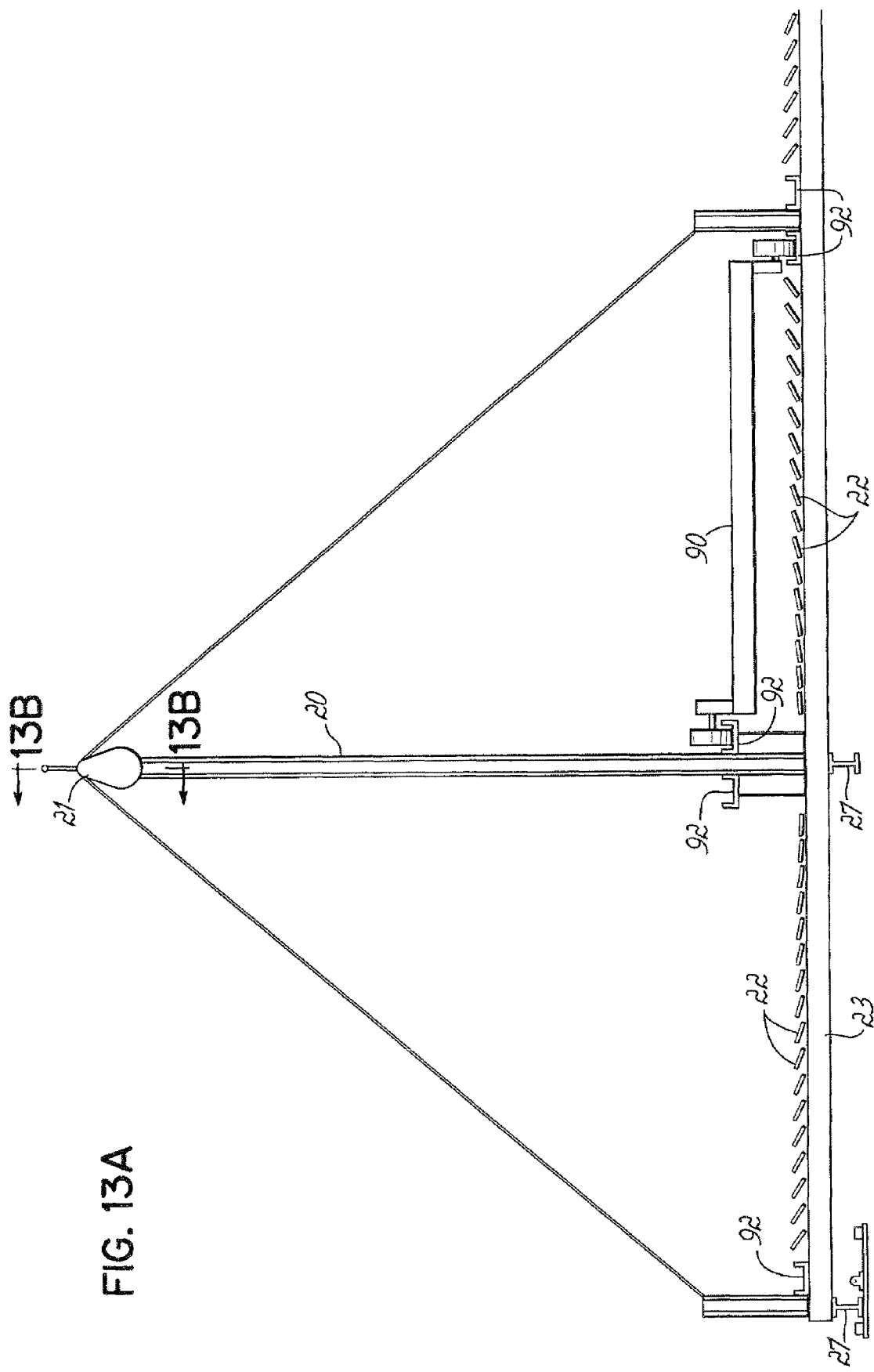

STEAM STORAGE SYSTEM FOR ARTIFICIAL SOLAR ISLAND

The present application is a continuation of and claims priority to PCT/IB2009/000223 filed Feb. 6, 2009, entitled "Steam Storage System For Artificial Solar Island," which in turn is a continuation-in-part of and claims priority to U.S. Provisional Application Ser. Nos. 61/027,248, filed Feb. 8, 2008, and also entitled "Steam Storage System For Artificial Solar Island." Both of these applications are expressly incorporated by reference herein, in their entireties.

FIELD OF THE INVENTION

The present invention relates to solar energy, and more particularly to a solar energy system for supplying energy during times of little or no sunlight.

THE STATE OF THE ART

The availability of energy storage systems is essential for increased market penetration of solar-thermal power plants. This kind of power plant uses concentrated solar radiation as the heat source to drive steam turbines. It offers the option of directly integrating backup energy sources to compensate for fluctuations in solar irradiation. This reduces the requirements placed on the electricity network and external backup capacity. Today's solar-thermal power plants mostly use natural gas during low solar irradiation. However, thermal energy storage systems should be integrated in future plants to achieve a better match between the availability of solar energy and demand for electricity. The main technical requirement for these storage systems is that they must work with a maximum operating temperature of up to 360° C.-400° C. and the desired electrical output of solar-thermal power plants.

Two different types of storage systems are currently under investigation. Buffer storage is used to provide energy within a short reaction time. The other type, medium-term storage, provides heat over several hours. These two types of storage complement one another. Buffer storage systems have a small capacity but are able to reach a high output within a short time period. In contrast, medium-term storage systems demand a longer reaction time but show lower capacity-specific costs. The state of the art talks about the availability of steam accumulators (also called Ruths storage systems) as an option for buffer storage. In these systems, pressurized water is used as a storage medium. During the charging cycle, steam is fed into the water volume where energy is directly transferred by condensation. The steam accumulator is depressurized during the discharge process and it provides saturated steam. Water is used both as a working medium and as a storage medium, so steam accumulators show very short reaction times. The storage capacity depends on the temperature variations of the liquid volume. During the discharge cycle, the decrease of the water temperature also causes a decrease in pressure of the steam provided. This means that constant-pressure operation using steam accumulators is not possible. The costs for the pressure vessel limit the size of steam accumulator systems. The correlation between saturation temperature and saturation pressure is logarithmic. Thus, a high operating pressure requires a more significant pressure decrease of the steam delivered during the discharge process. The principle of such Ruths steam accumulators was first invented by Wettstein and patented for the Ruths Accumulator Company in New York City in 1927. See U.S. Pat. No. 1,637,066, which is incorporated by reference into this application.

Various groups have developed heat storage devices for use in solar-thermal power generation. Among those the Deutsche Versuchsanstalt fuer Luft—und Raumfahrt (DLR) in Germany is one of the most pronounced advocates of so-called latent heat storage devices that do not use water but rather use a variety of other storage media. The argument given by DLR regarding this choice is reproduced below, as it demonstrates some of the major downsides associated with such latent heat storage devices.

Steam accumulators can only provide saturated steam. This, combined with cost aspects, means that alternative storage systems are necessary to cover the complete temperature range relevant for solar-thermal power plants. Experience with storage systems in the temperature range up to 400° C. is limited, and most systems use a liquid-storage medium like thermal oil or molten salt. Both of these solutions have high specific costs. There are also environmental aspects for the thermal oil approach, while the molten salt approach has the risk of freezing at temperatures between 140 and 230° C. A promising candidate material for sensible heat storage is concrete with an embedded heat exchanger. To optimize costs, the embedded heat exchanger design must be adapted to the demands of the power cycle and consider the heat transport properties of the concrete. The German Aerospace Center (DLR) has demonstrated the feasibility of solid-media storage systems operated by parabolic trough collectors at Almeria, Spain. For large-scale installations, the specific investment costs related to stored heat are estimated at between 20 and 30€/kWh.

Sensible heat storage in concrete is an attractive option for processes using single-phase working fluids such as thermal oil or air. However, the application of steam as a working medium requires the availability of isothermal storage if charging/discharging should take place at constant pressure. One solution is the application of phase-change materials (PCMs) using the latent heat released or absorbed during a change of state of aggregation. Because of the temperature range resulting from the operating pressure of solar-thermal power plants (20-100 bar), nitrate salts with melting points between 220 and 320° C. can be applied as PCMs.

Nitrate salts show low thermal conductivities of less than 1 W/mK. For this reason, a concept that can compensate for the poor heat-transport properties of the storage material is a requirement for the implementation of commercial PCM storage systems. Basically there are two approaches. One option is that the average distance for heat transfer within the material can be reduced by increasing the heat transfer area of the heat exchanger. The other approach is to increase the effective heat conductivity of the storage material by adding a material that exhibits good heat-transport properties.

Applicant leaves the description of state-of-the-art latent heat storage technologies here. As can readily be seen, these technologies are difficult to handle and the investment necessary for their implementation and maintenance is substantial. Environmental issues can also make it difficult or even unfeasible to implement such latent heat storage systems.

SUMMARY OF THE INVENTION

Applicant believes that the application of large scale Ruths storage technology is not only feasible in solar-thermal applications, but according to the findings of this invention it provides particular advantages over the state of the art proposed in latent heat storage technology as described above.

As the state of the art clearly shows, conventional power stations have been developed in the past that not only used Ruths accumulators for buffering, but also for longer term storage. One such example is shown in the study published by the Verein Deutscher Ingenieure VDI (VDI Berichte Nr. 1438, 1998; Erfahrungen aus der Plaung, der Inbetriebnahme und dem ersten Betriebsjahr des GuD-Kraftwerks der Gemeinschaftskraftwerk Tübingen GmbH—authors: M. Heinisch, R. Trumpf). The state of the art shown in this publication is incorporated by reference into this application. In this example, three 200 cubic meter Ruths storage devices were used in parallel to achieve a reliable operation of the power station during a period of up to 24 hours using stored steam only.

As is shown at http://de.geocities.com/infotaxi/schwung-alterntv.htm the Heating Power Station in Berlin—Charlottenburg used a Ruths steam storage device of 4480 cubic meters during a period of almost 60 years (1929 until about 1987) in routine operation.

Applicant has suggested the large scale production of solar-thermal power by using so-called solar islands that can either be land or sea-based. The following earlier patent applications filed by applicant in this context are cited herein and are incorporated by reference into this application: PCT/EP2007/056658, U.S. 60/892,956, U.S. 61/015,263.

As indicated above, longer term energy storage will be essential if industrial scale power production based on solar energy as a source is to achieve commercial success. Only power plants that are capable of delivering electrical energy at night and/or in times of peak power demand will actually achieve the environmental impact modern society is looking for in the light of global warming and primary energy sources such as oil, gas and coal coming to an end on earth in the foreseeable future.

This invention achieves these objectives by combining the solar island concept with steam storage technology that is adapted to the needs found in process engineering, particularly as regards the parameters of the Clausius Rankine process on the inventive solar island. Also, this invention achieves a second objective, specifically the desalination of sea water by using a modified design of traditional Ruths storage devices described in more detail below.

Furthermore, this invention also describes the use of the inventive steam storage system to supply power to absorption chillers in air-conditioning applications. In many countries in the sun-belt of the earth, power generation systems are reaching or have already reached maximum capacity because up to 70 percent of the available electrical power is consumed by air-conditioning systems. This represents an extremely inefficient way of using primary sources of energy because the overall efficiency of such a chain of transformation systems (fossil fuel to electricity, electricity driving an AC compressor in order to finally end up with an amount of chilled air) is extremely low, in most cases below 10-20 percent overall. This invention therefore suggests the integration of absorption chiller technology into applicant's solar steam generation and storage system as one environmentally advantageous application. Details of this element of the invention are given in more detail below.

These and other features of the invention will be more readily understood in view of the following detailed description and the drawings. Notably, FIGS. 1-14 relate specifically to a steam generating solar island structure, as claimed in earlier-filed patent applications. This structure is expressly included herein to show how this structure is used in conjunction with the various steam storage aspects of the present invention.

BRIEF DESCRIPTION OF THE DRAWINGS

FIG. 13A is a longitudinal view along one of the rows of Fresnel collectors, showing a rail supported cart which facilitates service and maintenance.

DETAILED DESCRIPTION OF THE DRAWINGS

The Solar Island

The present application claims the priority benefit of U.S. Provisional Application Ser. Nos. 60/892,956 filed Mar. 5, 2007, entitled "Solar Island"; 61/015,263 filed Dec. 20, 2007, entitled "Solar island;" and 61/030,390 filed Feb. 21, 2008, entitled "Solar Island," All three of these applications are expressly incorporated by reference herein, in their entireties.

Figure 1:
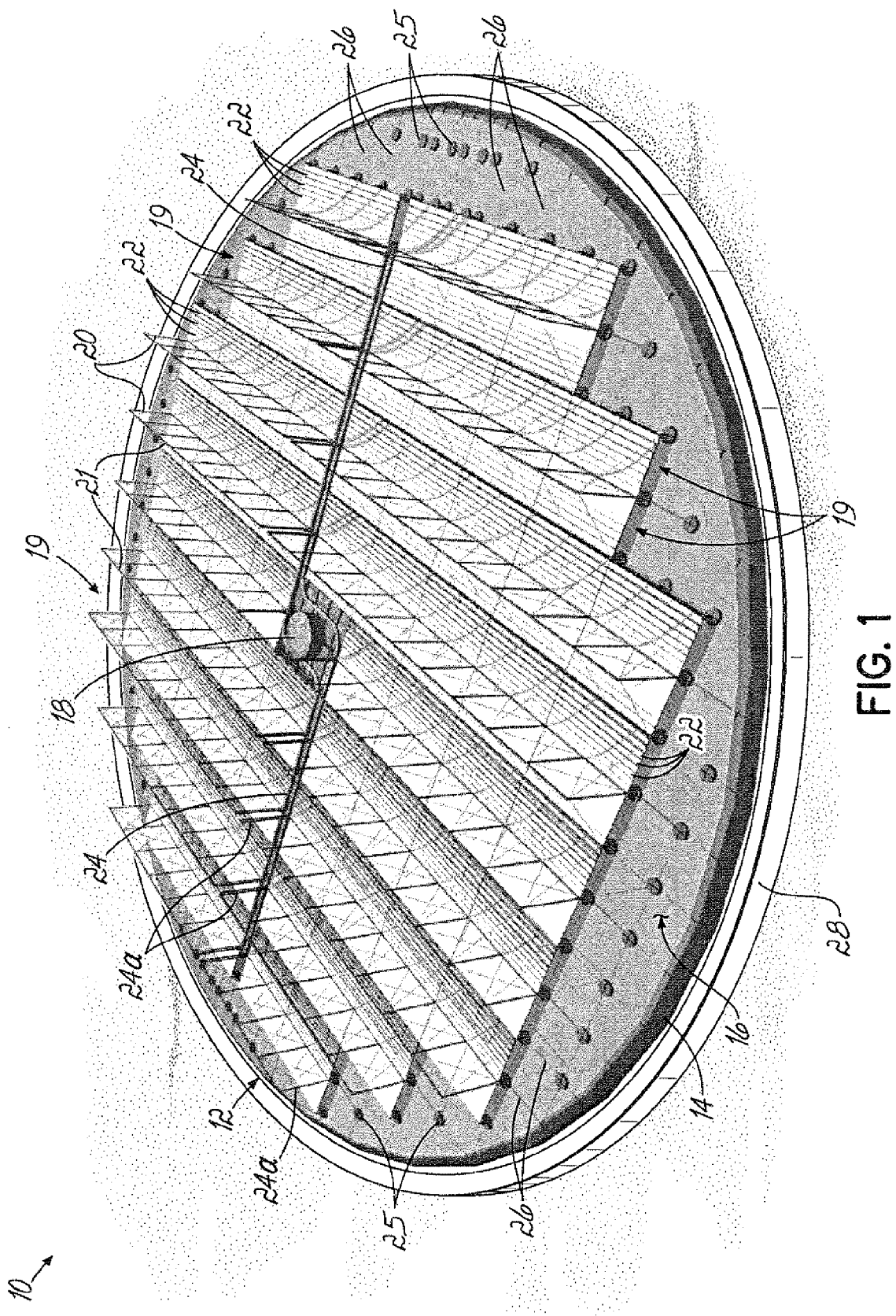
FIG. 1 is a perspective view of a man-made solar island.
Figure 1A:
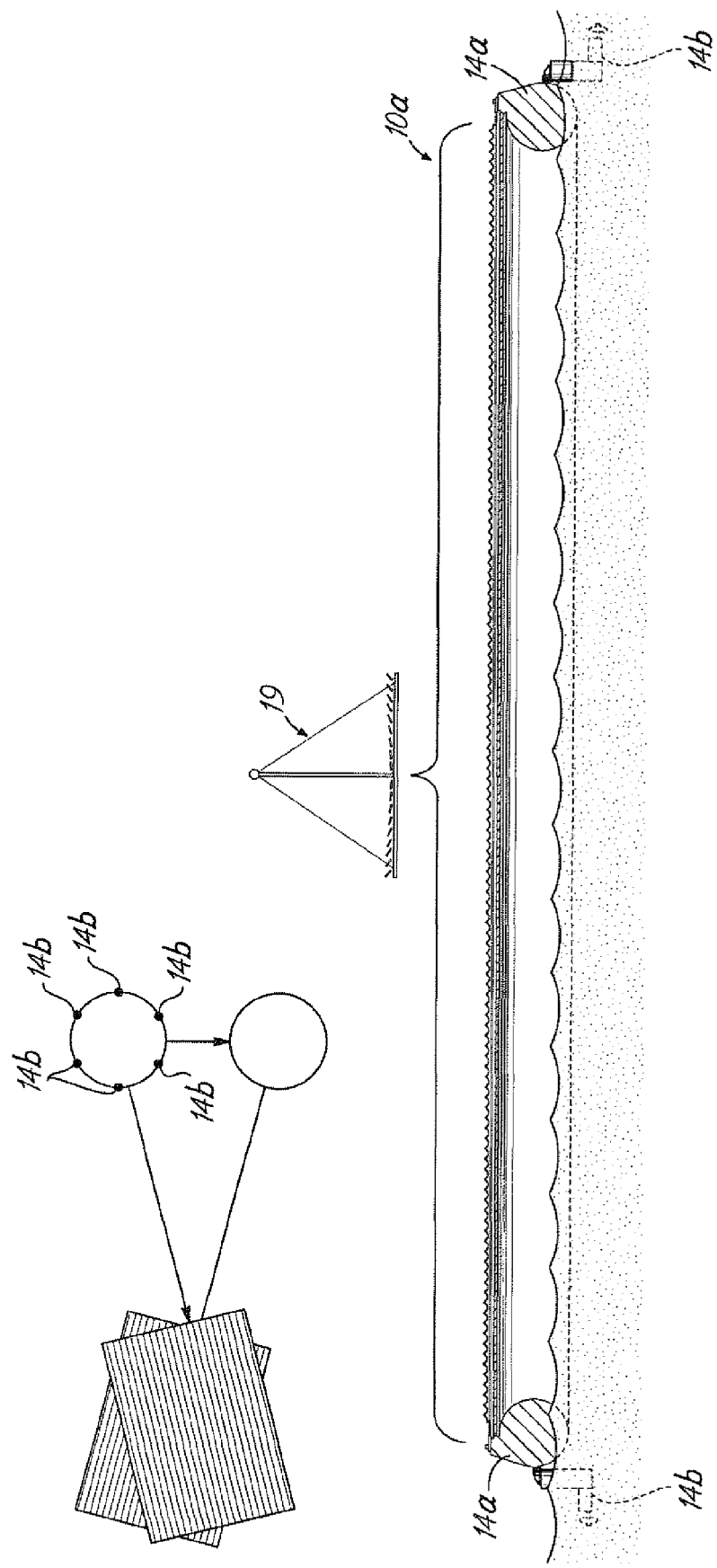

FIG. 1 shows a man-made island 10 constructed in accordance with one preferred embodiment of the invention. The island 10 generally comprises a horizontal platform 12, which in turn includes an outer support ring structure 14 that is spanned by a flexible cover 16. The cover 16 may be of any suitable flexible material that can be sealed along its opposing longitudinal edges, such as for instance by gluing, heat welding, or vulcanizing the adjacently located edges. In an initial prototype of the invention, for the cover 16 applicants are using an industrial foil known as SIKA Sarnafil TS 77-20. The island 10 includes a central hub 18 which will be described later in more detail.

The platform 12 supports a plurality of solar radiation collector modules arranged end to end in a plurality of parallel rows 19. Any given row 19 of modules includes a plurality of wire supported uprights 20, which in turn hold a horizontally oriented heat pipe 21. Each of the rows 19 includes a plurality of lower, parallel mounted solar concentrators, or reflector panels 22. Each of the concentrators 22 is fixed at a desired angle, so that all of the reflectors 22 reflect, or direct, sunlight upwardly toward the heat pipe 21. This concentrates the reflected solar radiation on the heat pipe 21. The platform 12 rotates to keep the rows 19 oriented perpendicular to the direction of the sun.

A water supply pipe and a steam pipe are routed to the central hub 18, and connect to two conduits 24 that extend in opposite directions. The conduits 24 connect to sub branches 24a that extend generally along the center of the island 10, so that in each row 19, the supply water can flow out and back along the respective heat pipe 21.

FIG. 1 also shows a plurality of pods 25 distributed across the upper surface of the cover 16, in a grid pattern designated generally by reference number 26. Although not shown in particular detail in FIG. 1, the pods 25 support a lightweight space frame 27, which generally occupies the spaces designated by the gridlines 26 in FIG. 1. The space frame 27 in turn supports the rows 19 of solar radiation collector modules.

Figure 2:
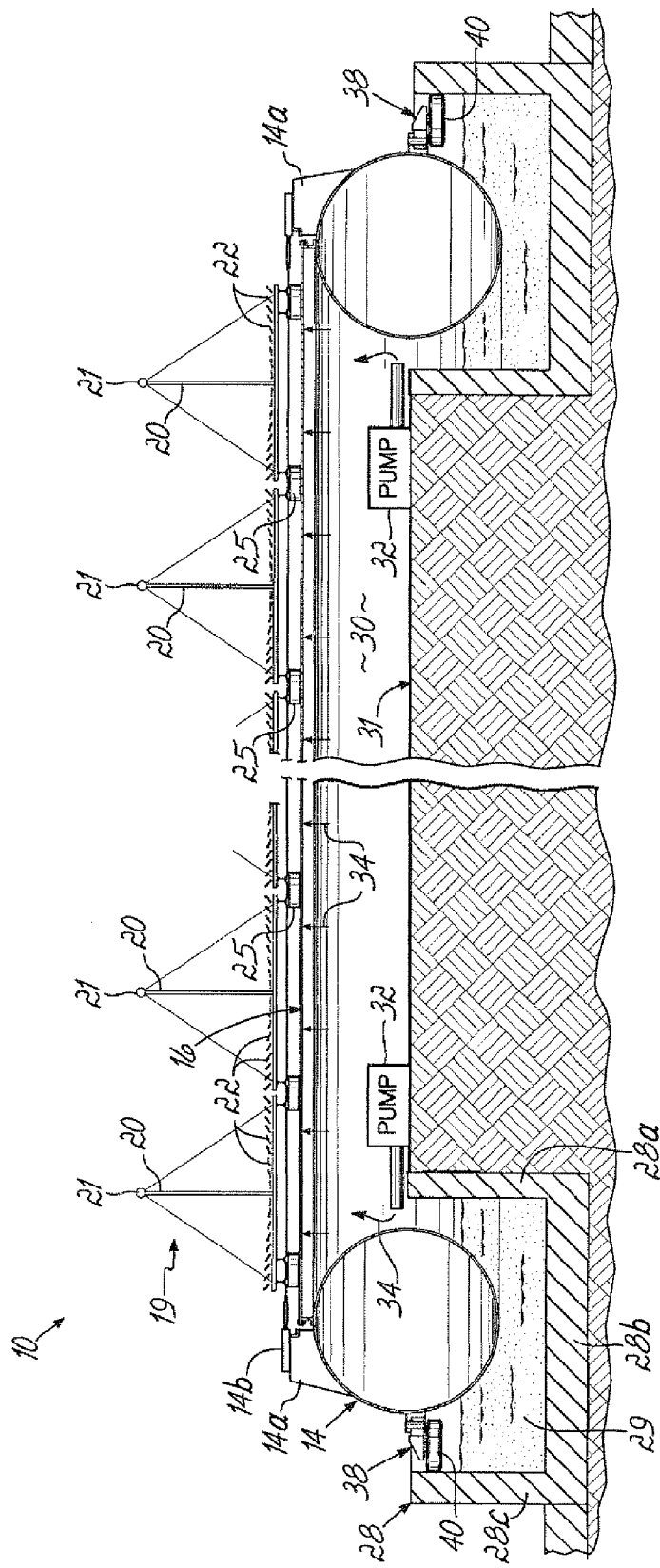
FIG. 2 is a horizontal sectional view which schematically shows a land-based version of the man-made solar island.

As described above, the man-made island 10 of this invention is a floating structure. This invention contemplates land-based or sea-based operation of this man-made island 10. FIG. 2 shows more details of the structural components of one preferred embodiment of the man-made island 10. More particularly, FIG. 2 shows the overall structure, and the manner in which the island 10 is floatably supported by the outer ring 14. Preferably, the ring 14 is made of connectable, prefabricated segments of steel, concrete, plastic, aluminum, or any other suitable material. If the segments of the ring 14 are made of steel, they preferably welded together. Particularly for a sea-based version of the island 10, the segments have internal support structures. These internal support structures isolate adjacently located segments of the ring 14, thereby to isolate adjacently located sections of the ring 14, so as to isolate any leaks that might occur. In one prototype construction of the land-based version of this island 10, the platform 12 is about 85 meters in diameter, the segments have a diameter of about two meters, and a length of about 7.5 meters. Preferably, the sections of the ring 14 are placed and interconnected while in the trench 28, and preferably supported on a temporary structure which can then be removed after the trench 28 is filled with water 29. The trench 28 must be able to support the weight of the ring 14. For the prototype, applicants estimate that the ring 14 will have a total weight of about 100 tons (100,000 kg), which corresponds to a weight of about 380 kg per square meter.

FIG. 2 shows the outer ring 14 floatably located within a trench or trough 28. As shown in FIG. 2, the trench has an inside wall 28a, a bottom wall 28b, and an outer wall 28c. The trench 28 is preferably made of concrete. The thickness of each of the walls 28a, 28b, and 28c is determined according to local geological surveys and any applicable building code. The trench 28 includes a fluid of suitable viscosity, and particularly a liquid such as water 29, so as to float the support ring 14.

FIG. 2 also shows the enclosed volume 30 located below the cover 16, and further defined, or bounded by the ring 14, the water 29 in the trough 28, and the ground 31 or floor surface located in the center of the island 10. Preferably, the surface 31 is even with the top of the inside wall 28a. This may be done by sand-filling, and the sand then covered by PVC foil of 2 mm thickness, preferably a flexible polyolefin based foil reinforced with polyester thread and/or a fleece made of glassfibre. A compressor system 32, preferably a plurality of compressors, or pumps, is located so as to be in fluid communication with the enclosed volume 30. In FIG. 2, the pump 32 is shown below the floor 31 in the middle of the island 10. Nonetheless, it could also be centrally located within an operations room or facility for operating the island 10, or even placed on the ring 14. The pump 32 pumps air into the enclosed volume 30, as shown by directional arrows 34, to maintain a suitable over-pressurization condition beneath the cover 16 and within volume 30. Applicants currently expect that the actual amount of over-pressure within the enclosed volume 30 will be about 0.005 bar, although that value may vary somewhat depending upon the dynamic conditions, and in some situations it could be substantially greater. FIG. 2 also shows an upwardly extending outer rim structure 14a, which extends upwardly from each of the segments of the ring 14 to create an outer top surface 14b around the top of the ring 14.

Figure 3:
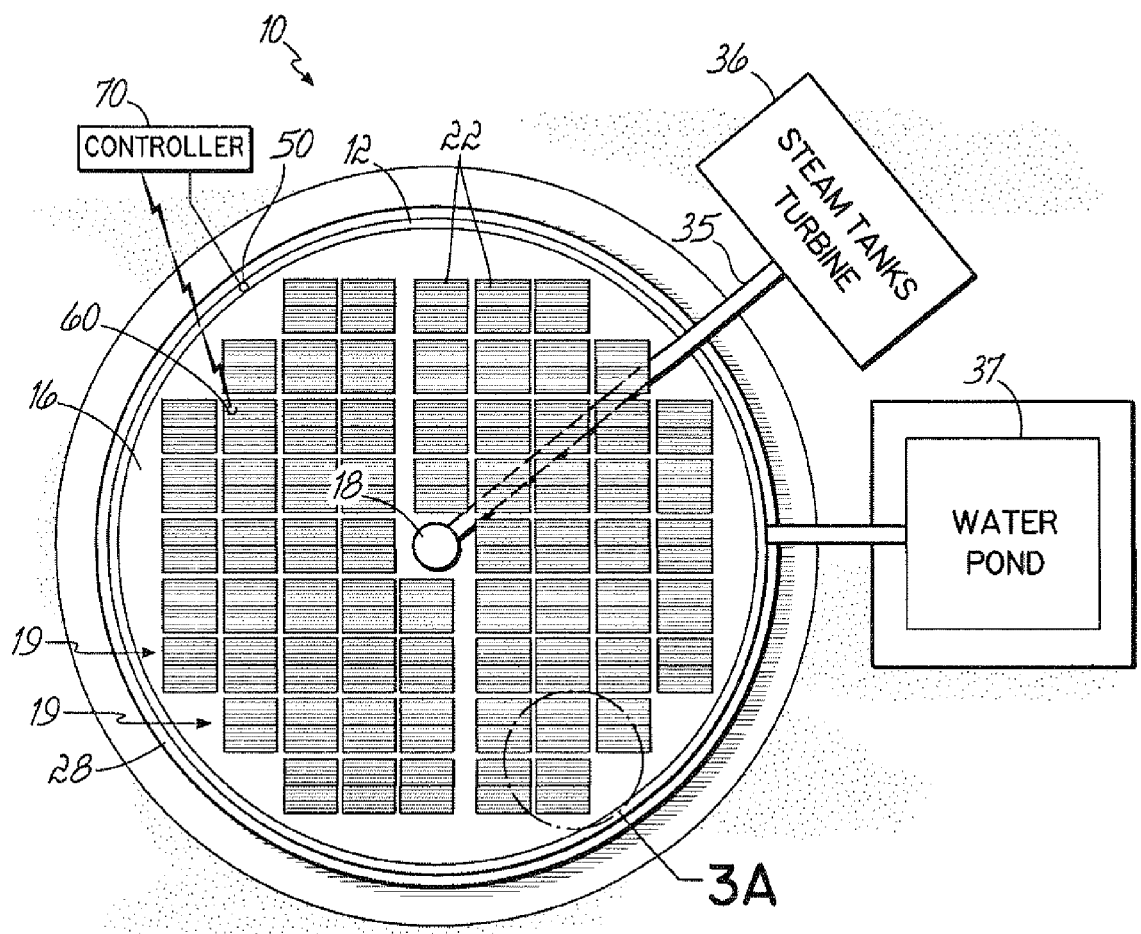
FIG. 3 is a plan view, in schematic form, which shows a land-based version of the man-made solar island.

FIG. 3 shows one example of the land-based version of this man-made island 10, including a radially oriented subsurface tunnel 35 that extends outwardly from the center hub 18 of the structure, beyond the outer wall 28c of the trench 28 to an energy facility 36, which may be a turbine generator or other facility for storing or using the solar generated steam produced by the island 10. Preferably, the tunnel 35 carries the water pipes which connect to the conduits 24, and also any electrical connectors. The tunnel 35 floor slopes downward from the center of the island 10, so as to extend below the bottom of the trench 28 and also to prevent any water or other liquid from flowing to the center of the island 10. A pond 37 is located nearby to supply water to the trench 28, as needed. It preferably connects to trench 28 from below, to facilitate quick draining of the trench 28.

FIG. 3 also shows another view of the rows 19 of modules. Generally, for each module the concentrators 22 are about 8 meters in length.

Figure 4A:
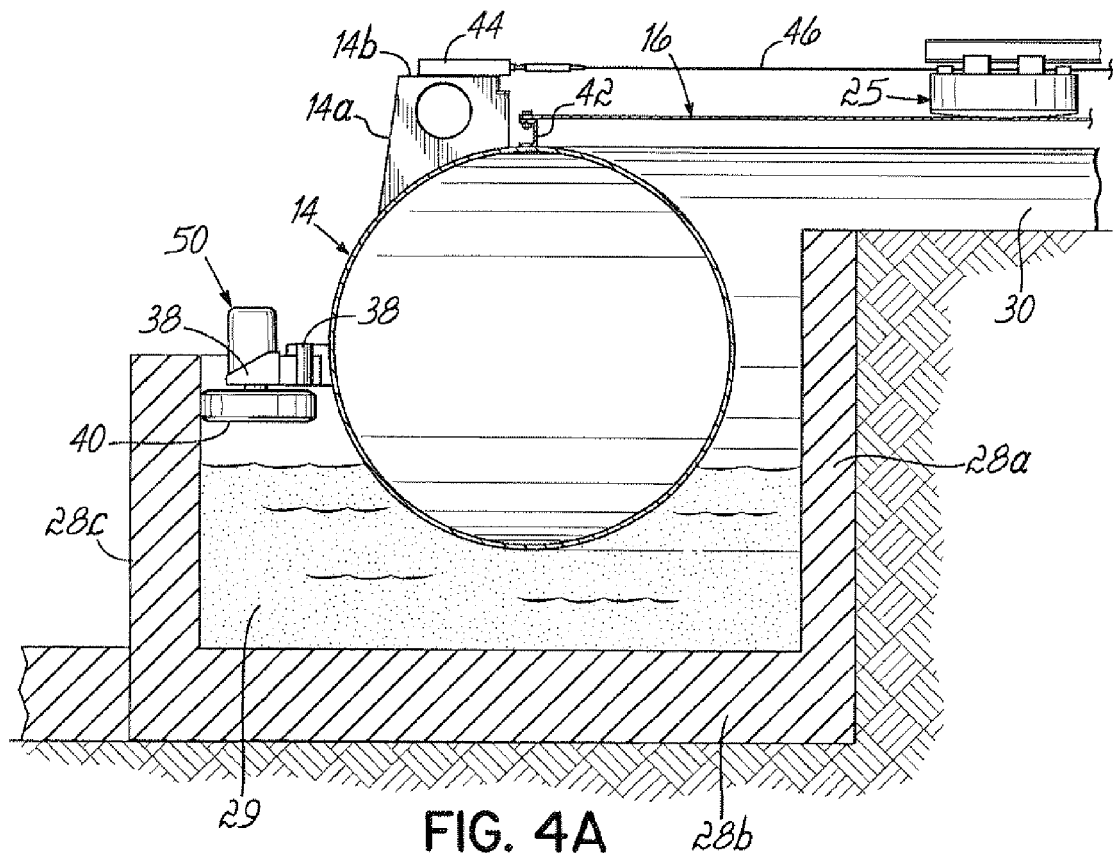
FIG. 4A is a horizontal sectional view which schematically shows the outer ring structure and the trough of a land-based man-made solar island.

FIG. 2 and also FIG. 4A show details of a centering mechanism 38 that centers the island 10 on its central axis. More specifically, the centering mechanism 38 resides radially beyond the ring 14 and within the inside surface of the outer wall 28c of trench 28. This centering mechanism 38 comprises a bracket 39 mounted to the ring 14, which supports a rotatable wheel 40 that resides in contact with the outer wall 28c. It is important that the inner surface of the outer wall 28c be constructed so as to be perfectly round, or with a very low tolerance. This requirement is necessary because angular adjustment of the island 10 is achieved via these wheels 40. The invention also contemplates an alternative mounting option, that of mounting the brackets 39 on the outer wall 28c so that the wheels 40 contact the ring 14.

Although the number of wheels 40 may vary, applicants expect that twelve such wheels 40 will be needed around the circumference of the ring 14, with the wheels spaced every 30 degrees. Nonetheless, additional wheels could be used to more equally distribute the load between the outer wall 28c and the ring 14. The wheels 40 can be standard automotive wheels. Also, some of the wheels 40, preferably four, serve the additional purpose of rotatably driving the ring 14 about its axis to a desired position, to optimize the performance of the reflectors 22. Thus, some of the wheels 40 are part of the centering mechanism and the driving mechanism. FIG. 4A also shows a motor housing 50, which indicates that the wheel 40 shown is one of the four dual purpose wheels 40.

Those skilled in the art will appreciate that at any give time the force between the wheels 40 and the wall 28c will act on only one side of the ring 14, depending upon the direction of the wind. Thus, only about half of the centering wheels 40 will be used to transmit angular force to the ring relative to the outer wall 28c. Nonetheless, the outer wall 28c and its foundation must be dimensioned and reinforced so as to carry this load. If there is no wind at all, or very low wind, then all of the wheels 40 will contact the outer wall 28c and carry the rotational load, although the load will be more evenly distributed about the entire circumference of the ring 14.

Figure 4B:
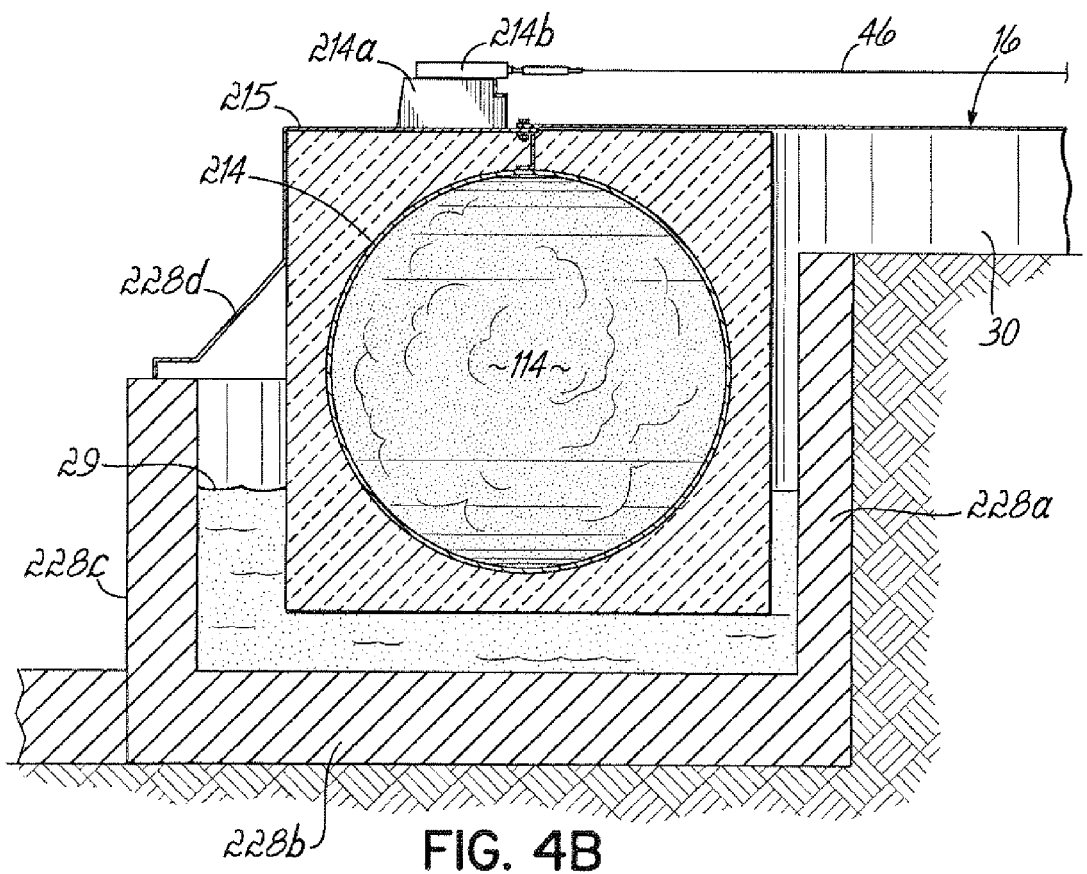
FIG. 4B is a horizontal section view, similar to FIG. 4A, which schematically shows yet another variation of the outer ring structure and the trough, for the land-based version of the man-made solar island.

FIGS. 4A and 4B show the outer ring structure 14, along with some of the structural details of the island 10. Due to the larger size of FIG. 4A (compared to FIG. 2), FIG. 4A shows more clearly an outer bracket 42, preferably a steel ring torus with a U-shape, turned on its side, which secures or clamps the outer peripheral edge of the cover 16. FIG. 4A also shows some aspects of an alternative structure used to support the rows 19 of solar collector modules. More particularly, FIG. 4A shows details of a tensioned cable system which coacts with the pod 25. It is expected that the cable 46 will need to accommodate a tension force in the range of about 10-25 kW. More particularly, a fixed mounting support 44 holds the outer end of a tightened cable 46 which spans across the island 10 above the cover 16, in a manner which enables the pods 25 to essentially hang from, or be suspended between, the cable 46 above and the cover 16 below. Preferably, the pods 25 are adapted to accommodate the cable 46 of such a cable system and also the space frame components, to enhance versatility in constructing the island 10 and in supporting the solar collector modules.

FIG. 4B is similar to FIG. 4A, except FIG. 4B shows another variation of the invention wherein the ring 214 stores steam 114 generated by the collector modules, and the ring 214 is encased within a square-shaped (in cross section) outer insulation section 215. FIG. 4B also shows an outwardly extending skirt 228d that extends from the ring 214 to the outer wall 228c of the trench 228. This skirt 228d is usable with the other variations of the invention. The skirt 228d helps to prevent evaporation of fluid from the trough 228, and may also aid in preventing dust or other debris from falling therein.

Figure 5:
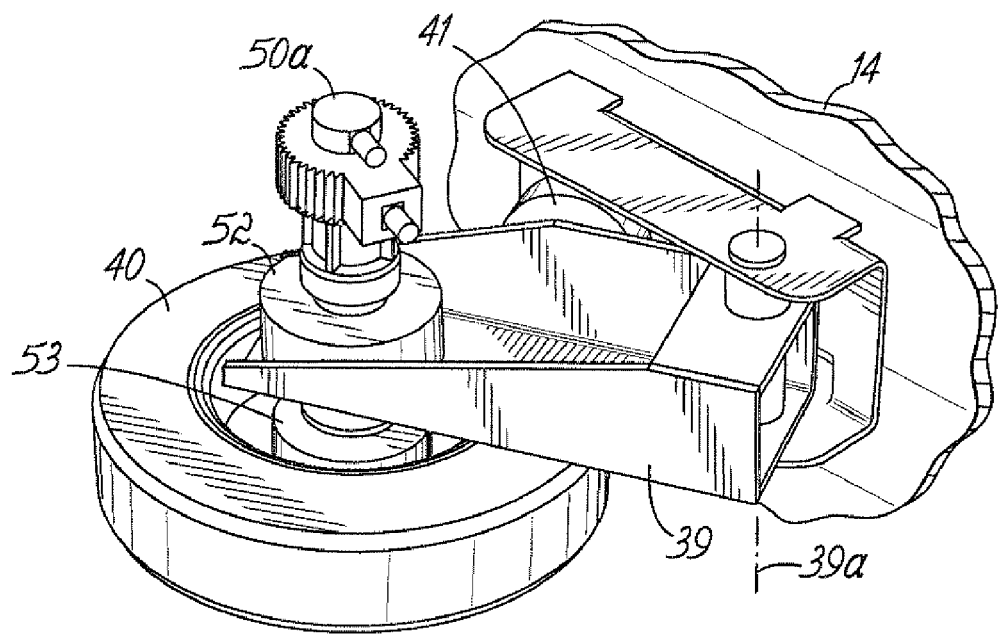
FIG. 5 is a perspective view of a drive wheel unit, shown connected to the outer ring structure, according to one embodiment of the drive mechanism.
Figure 6:
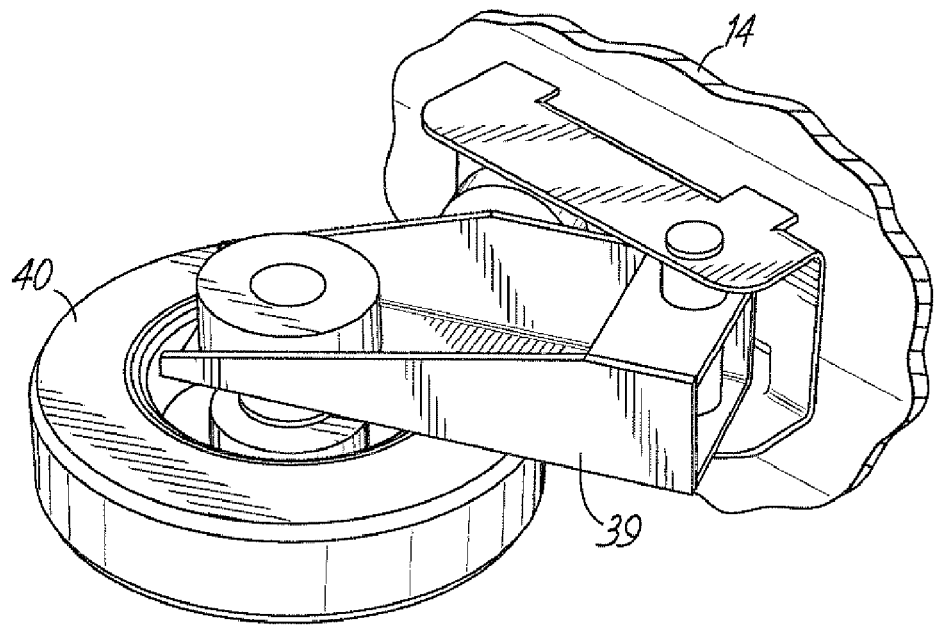
FIG. 6 is a perspective view, similar to FIG. 4, of a centering wheel unit, shown connected to the outer ring structure, according to one embodiment of the centering mechanism.

FIG. 5 more clearly shows one of the centering wheels 40 that is also used to rotatably drive the island 10. This is achieved by mounting a drive mechanism, i.e. a motor 50a, to the same structure which supports a centering wheel, as shown in FIG. 6.

In either case, the wheel 40 has a bracket 39 mounted to the ring 14. The bracket 39 includes a horizontally oriented hinge axis 39a, and a spring 41 that acts as a shock absorber between the hingedly connected sections of the bracket 39 (hingedly connected with respect to the axis 39a). FIG. 4A shows a motor housing 50, which covers the motor 50a that is shown in FIG. 5. Preferably, the drive mechanism includes a speed reducer 52 and an adapter 53 mounted to the bracket 39 with the wheel 40. Still further, as shown in FIG. 3, the motor housing 50 operatively connects to a computer controller 70 via an electrical connection, to rotatably control the angular position of the island 10. This electrical connection could be wireless, if desired, or via any other suitably convenient electrical connector.

Figure 7A:
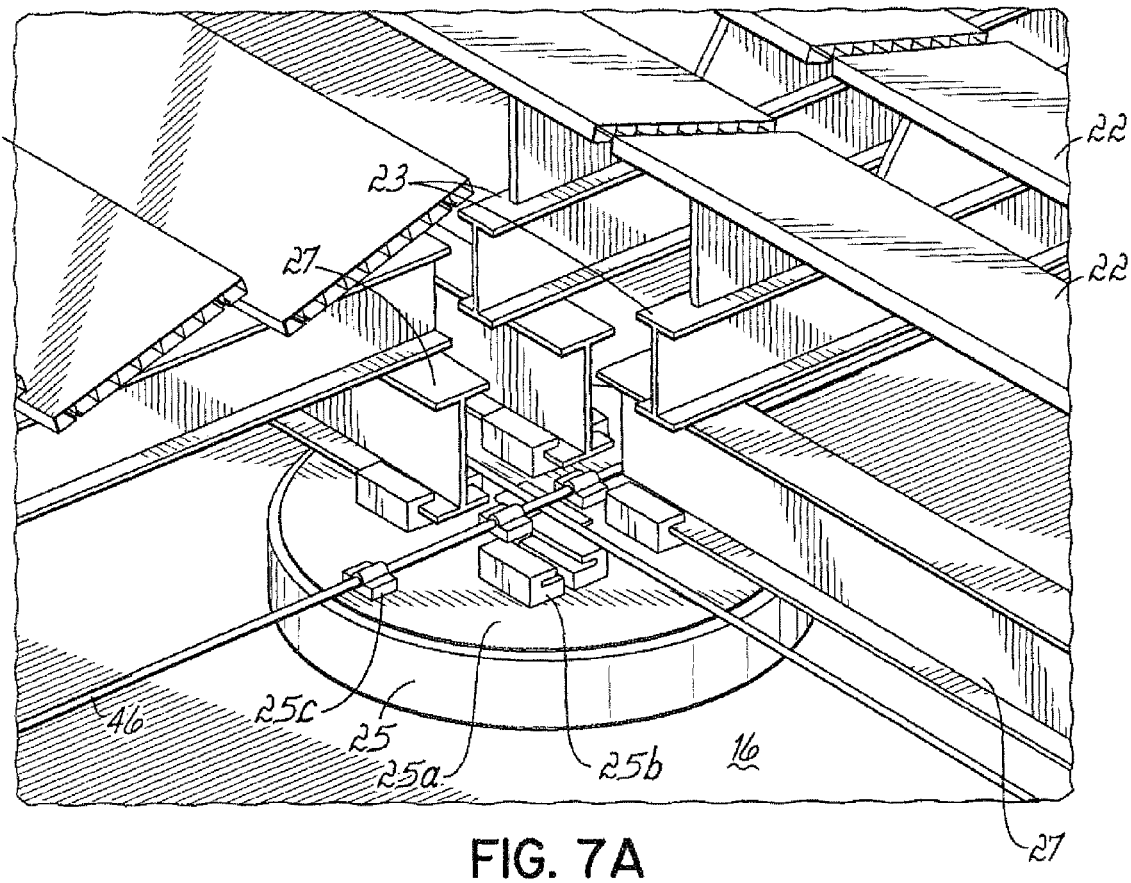
FIG. 7A is a perspective view of a pod supporting a portion of a lightweight space frame on the cover of the platform, in accordance with one embodiment of the upper structure.

FIG. 7A shows an enlarged view of one portion of this man-made island 10, and particularly a portion where a space frame 27 mounts to one of the pods 25. FIG. 7A particularly shows that the space frame 27 preferably uses an I-beam construction. FIG. 7A also shows that a top 25a of the pod 25 includes upwardly directed channel brackets 25b for securely holding the lower ends of the space frame 27. These brackets 25b may be part of a top piece 25a of the pod 25, in the form of a plate, to which the brackets 25b are connected by any sufficient securement mechanism. FIG. 7A also shows the concentrators 22 supported on a lattice or pallet-like structure 23, which also preferably uses an I-beam construction.

Figure 7B:
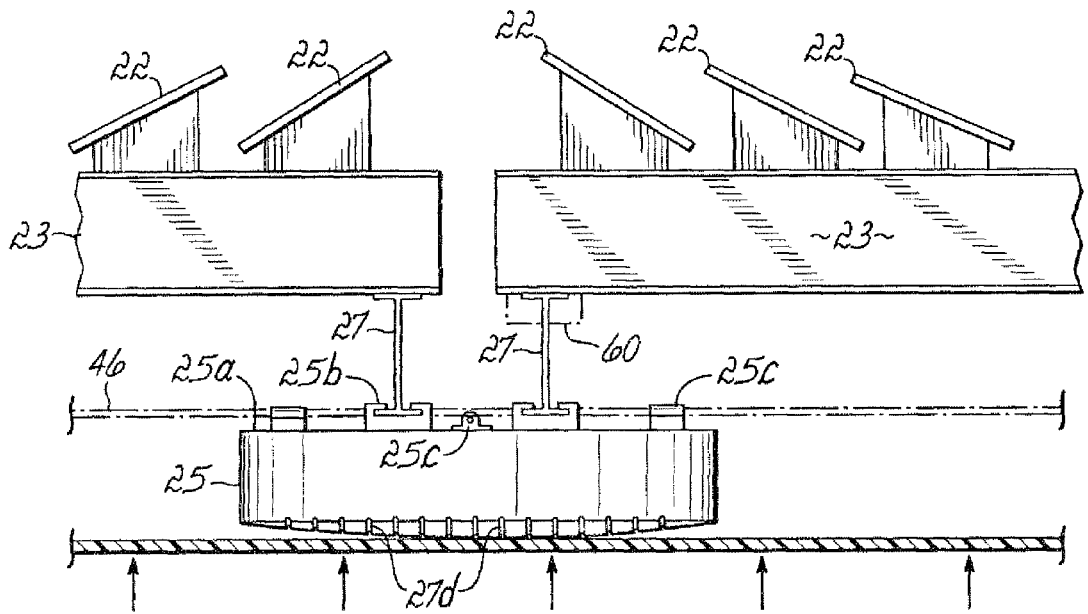
FIG. 7B is a horizontal view which schematically shows the pod and other structures shown in FIG. 7A.

In addition to the space frame 27, or as an alternative thereto, the cable system can be used for supporting the solar collector modules. FIGS. 7A and 7B show the cable 46 in phantom, to illustrate that it is an additional, or an alternative structure for providing support. Also, as shown in FIG. 7B, the pod 25 includes upwardly extending hangers 25c which connect to the cable 46. Still further, FIG. 7B shows a sensor 60, which may be a strain gauge, mounted in position to sense the strain on the space frame 27. As mentioned previously, a plurality of such sensors 60 are distributed throughout the platform 12, and are operatively connected in a network (not shown) to convey to the computer controller 70 (FIG. 3) the sensed conditions. The sensors 60 may be adapted to sense any one of a number of different measurable conditions. Preferably, the controller 70 also causes the compressor system 32 to respond appropriately to the sensed conditions, by dynamically adjusting the amount of over-pressurization.

Figure 8:
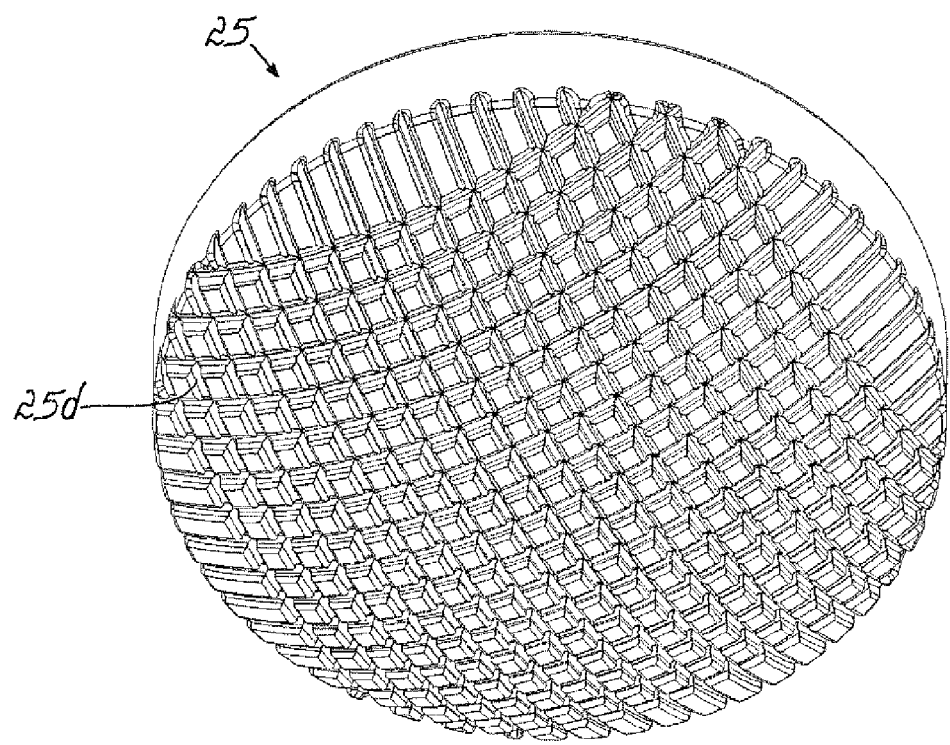
FIG. 8 is a perspective view which schematically shows the bottom of a pod of the type shown in FIGS. 7A and 7B.
Figure 9:
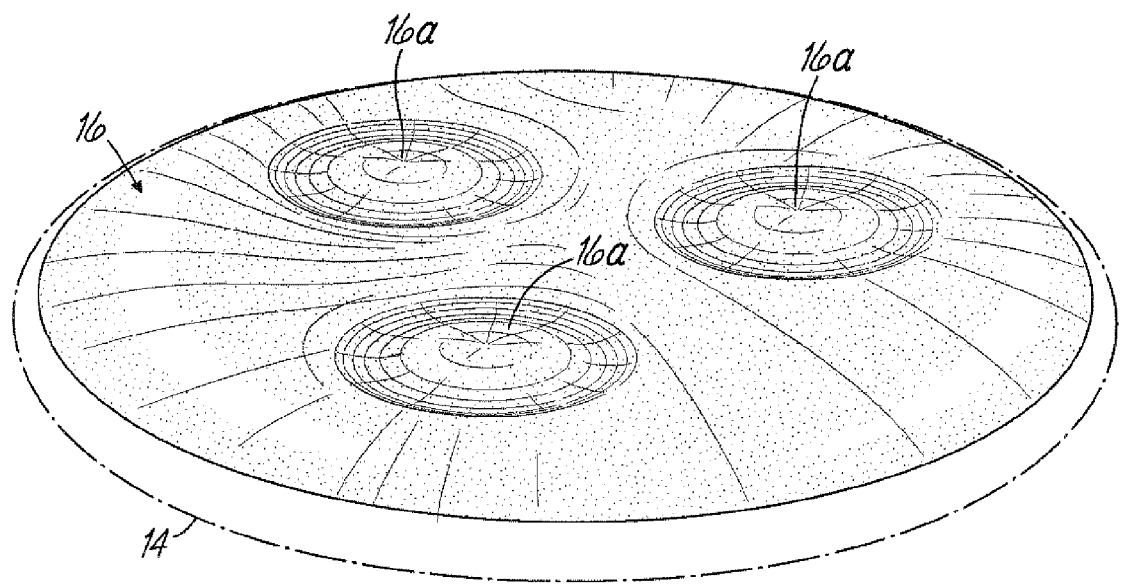
FIG. 9 is a perspective view which schematically shows a computer-model generated simulation of the depressions that could occur on the cover of the man-made solar island.

FIG. 8 shows a bottom profiled surface 25d of pod 25. FIG. 9 is a computer simulated view of the cover 16, with three noticeable dimples, or depressions, as a result of the load supported thereabove. These dimples are designated via reference numerals 16a, 16b, and 16c. They show the need for dynamic over-pressurization and strain sensing to achieve a relatively flat, or at least undimpled surface.

Figure 10:
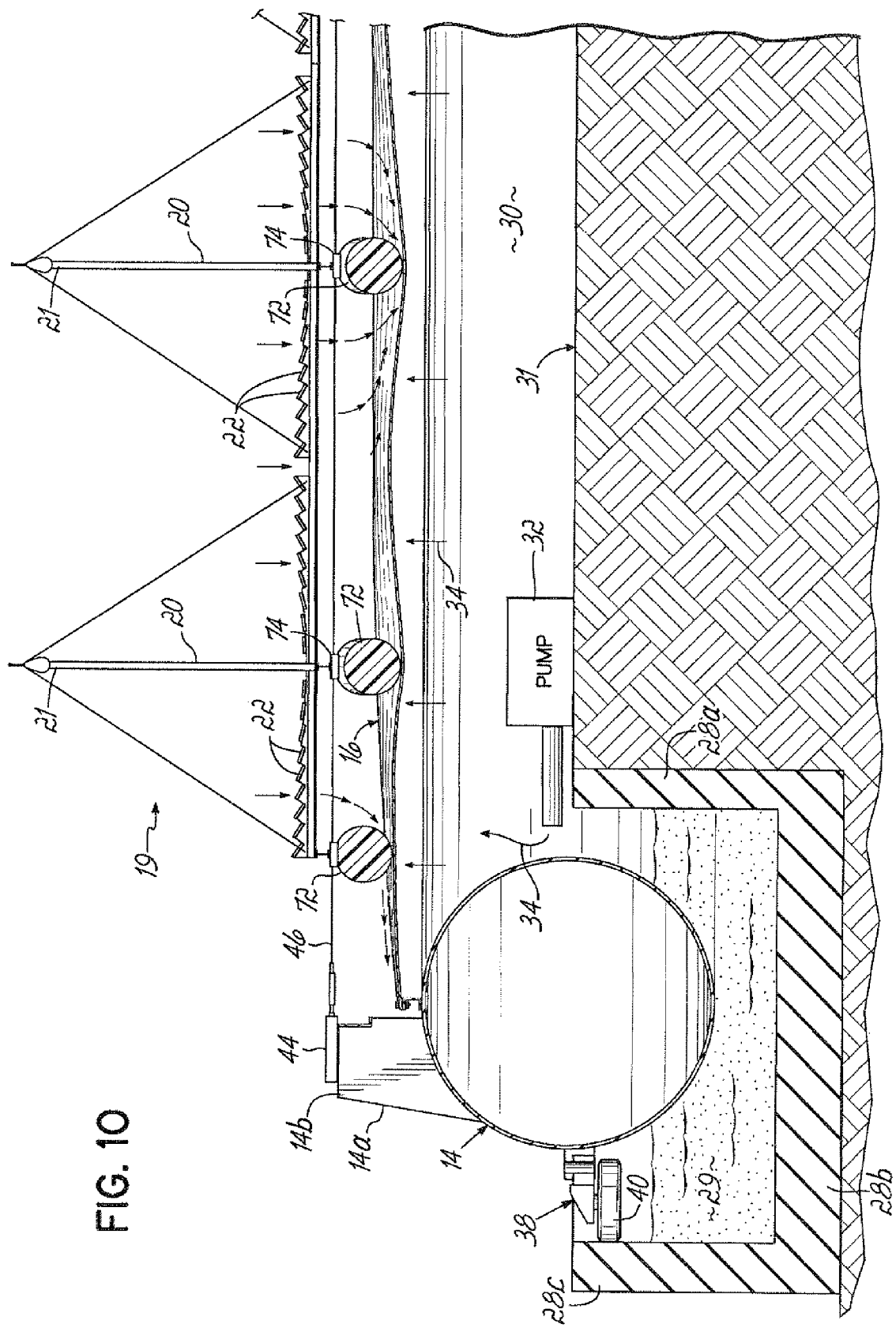
FIG. 10 is a horizontal view that schematically shows another embodiment for the upper structure, namely a cable system that cooperates with a plurality of pontoons, which in turn hold support boards onto which Fresnel-type solar concentrators are mounted.

FIG. 10 is similar to FIGS. 4A and 4B, but shows more details of the cable and pontoon structure used to support the rows 19 of solar collector modules. In this particular embodiment of the invention, the cable 46 spans across the top of the cover 16, transversely across a plurality of pontoons 72 which are arranged in parallel rows on the cover 16. The pontoons 72 can be made of plastic or any other suitable lightweight material. Applicants contemplate using pontoons of the type industrially manufactured and distributed by e.g. Robin Kunstoffprodukte, of Teterow, Germany and Technus KG (GmbH and Co.), also of Teterow, Germany. Preferably, the cable 46 engages a plurality of braces, or boards 74, supported on top of the pontoons 72 (or rows of pontoons). The boards 74 support the lattice 23 which holds the solar concentrators 22. FIG. 10 shows depressions formed in cover 16 alongside the pontoons 72. These parallel depressions facilitate the runoff of rainwater, and also eliminate a centrally located bulge that could result from the over-pressurization. Surface runoff may be more controllable because it will generally flow to these known depressions.

Figure 10A:
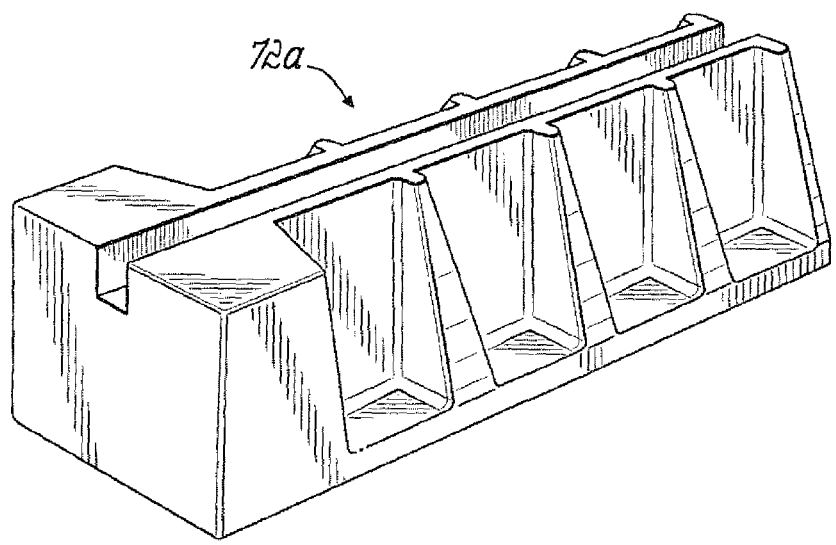
FIG. 10A is a perspective view showing an alternative pontoon structure.

FIG. 10A shows another version of the pontoon, designated by reference numeral 72a. This pontoon 72a has a formed, preferably molded, top surface structure designed to facilitate holding of the upper structure and/or other structure which supports the modules.

Figure 11:
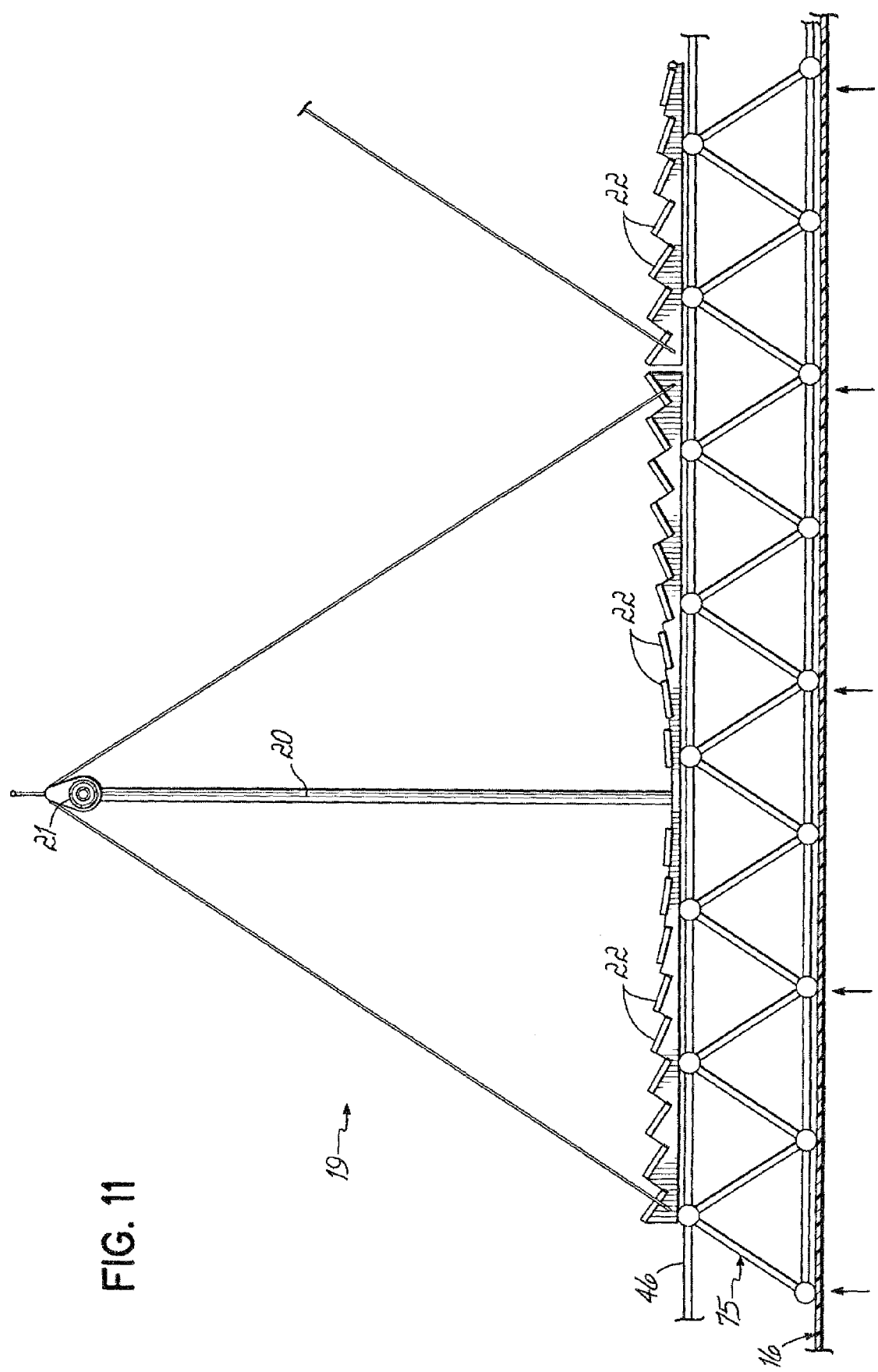
FIG. 11 is a horizontal view which schematically shows yet another embodiment for the upper structure, a honeycomb structure onto which a Fresnel-type collector is mounted.

FIG. 11 shows a side view of yet another embodiment of the upper structure used to support the solar radiation collectors. More particularly, FIG. 11 shows a honeycomb-type structure 75 residing between the cover 16 and the solar collectors 22c and also supported by cable 46.

Figure 12A:
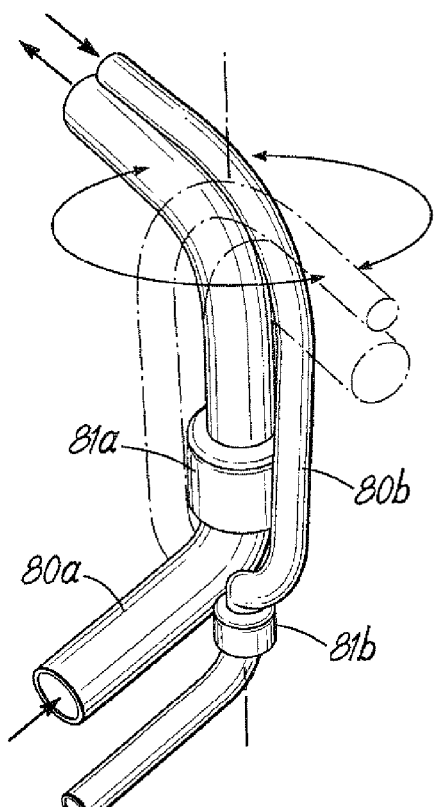
FIGS. 12A and 12B are perspective views which show two alternative structures for routing fluid, i.e. water and/or steam, to and from the island 10 via a rotary joint located at the hub 18.
Figure 12B:
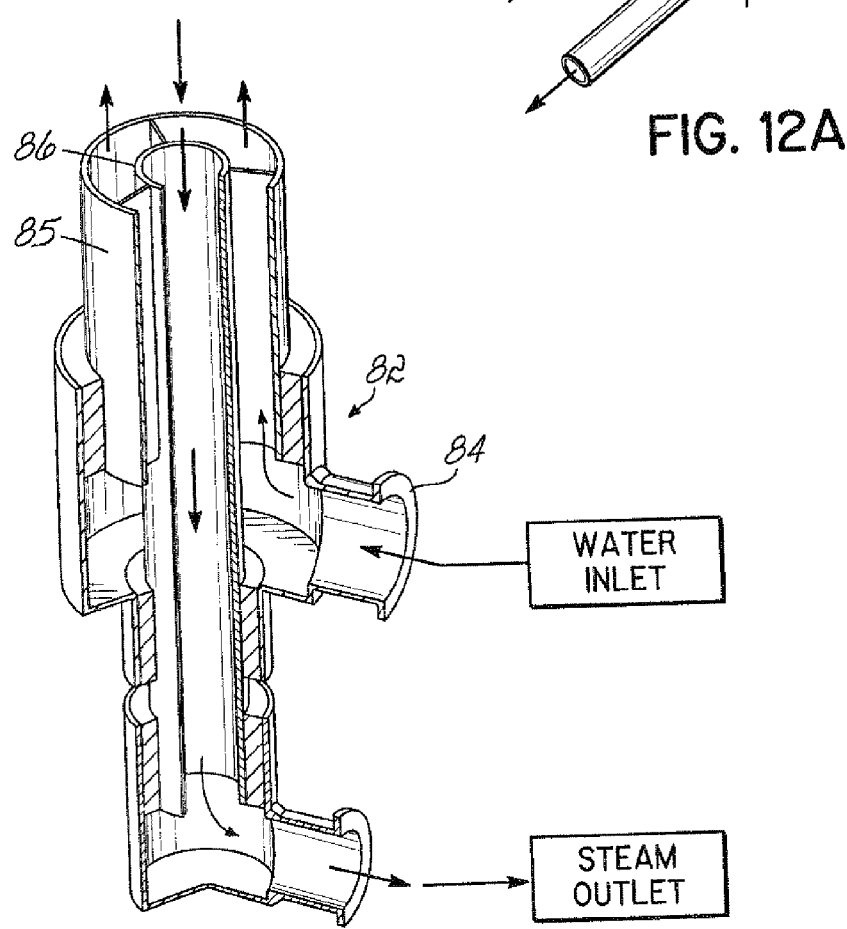

FIGS. 12A and 12B show variations on the rotary joint for use at the center hub 18 of the island 10. More particularly, FIG. 12A shows an inlet pipe and an outlet pipe, designated 80a and 80b respectively, both of which include a respective sleeve 81a and 81b, which permits some relative rotation between the upper and lower sections thereof, at least in the range of about 240 to 260 degrees. FIG. 12 B shows a coaxial version 82 of the rotary joint. More particularly, water inlet 84 supplies water to an outer annularly shaped flow passage within outer pipe 85, for water flowing toward the solar collector modules. After the water has been heated and steam has been created, it returns via central heat pipe 86 (which is rotatable with respect to outer pipe 85 and to the inlet 84). The steam generated via the solar collectors eventually flows toward the bottom of the rotary joint 82 and exits the joint via a steam outlet 88.

Figure 13B:
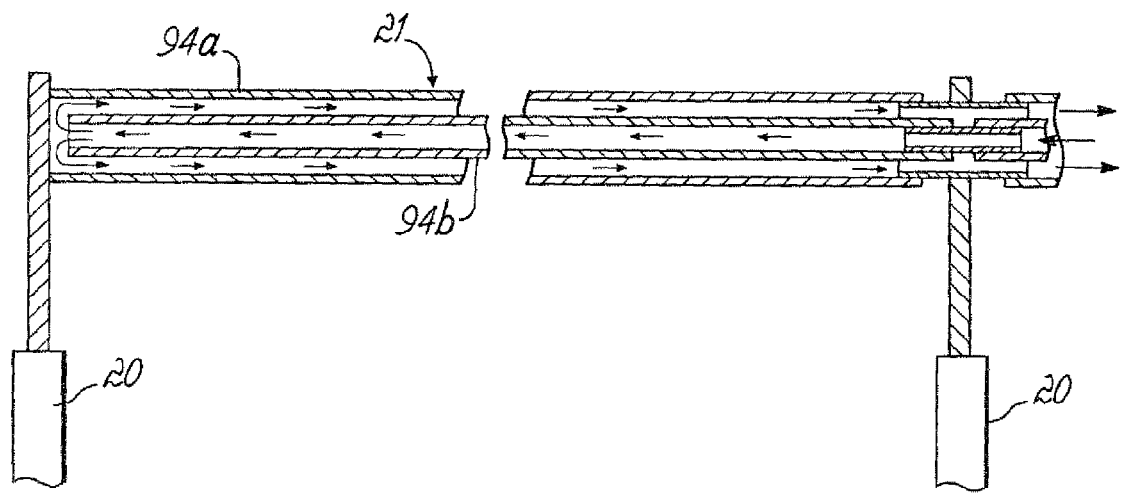
FIG. 13B is a cross-sectional view along lines 13B-13B of FIG. 13A.

FIGS. 13A and 13B show two additional features of the invention. More particularly, FIG. 13A shows a wheel supported cart 90 which rolls along a pair of spaced rails 92 arranged parallel with the rows 19 of the solar collector modules. This facilitates maintenance of the collectors, and does so in a manner that does not interfere with the solar collection structure.

FIG. 13B shows one embodiment for incorporating a preheating feature into this invention. More particularly, FIG. 13B shows the uprights 20 of one of the rows 19 of solar collector modules, and the heat pipe 21 configured as a coaxial pipe structure 94 that spans between the uprights 20. More particularly, the pipe structure 94 is a coaxial pipe with an outer annular channel 94a and a centrally located inner channel 94b. With the panels 22 of the solar collector modules concentrating and directing the sunlight upwardly, water flowing outbound (to the left in FIG. 13B) via central channel 94b is preheated by the heat emanating from steam flowing in the outer channel 94a (which is flowing to the right in FIG. 13B). The outer channel 94a receives the greatest concentration of redirected radiation from the sunlight. Thus, the heated steam within channel 94a also causes heat to emanate radially inwardly to preheat the fluid flowing in the inner channel 94b. This same principle could be used with an upper outbound channel 94a and a lower return (steam generating) channel 94b, if the coaxial version of this piping structure proves too cumbersome or too expensive to manufacture or install.

Figure 3A:
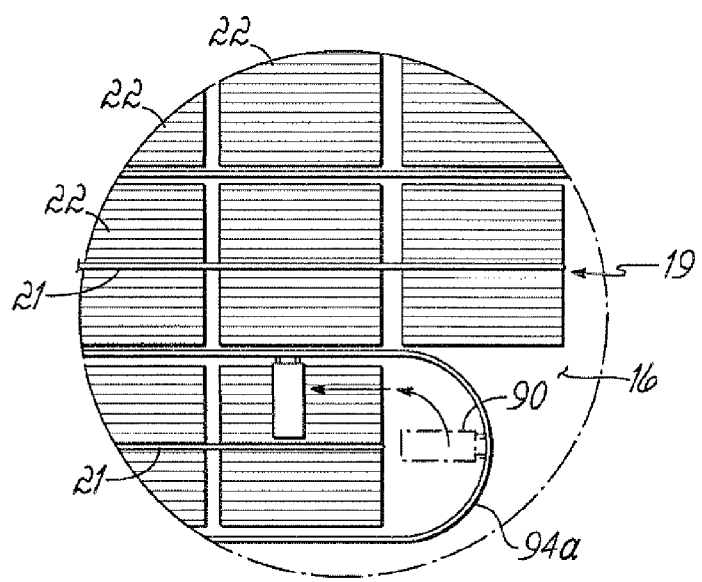
Figure 14:
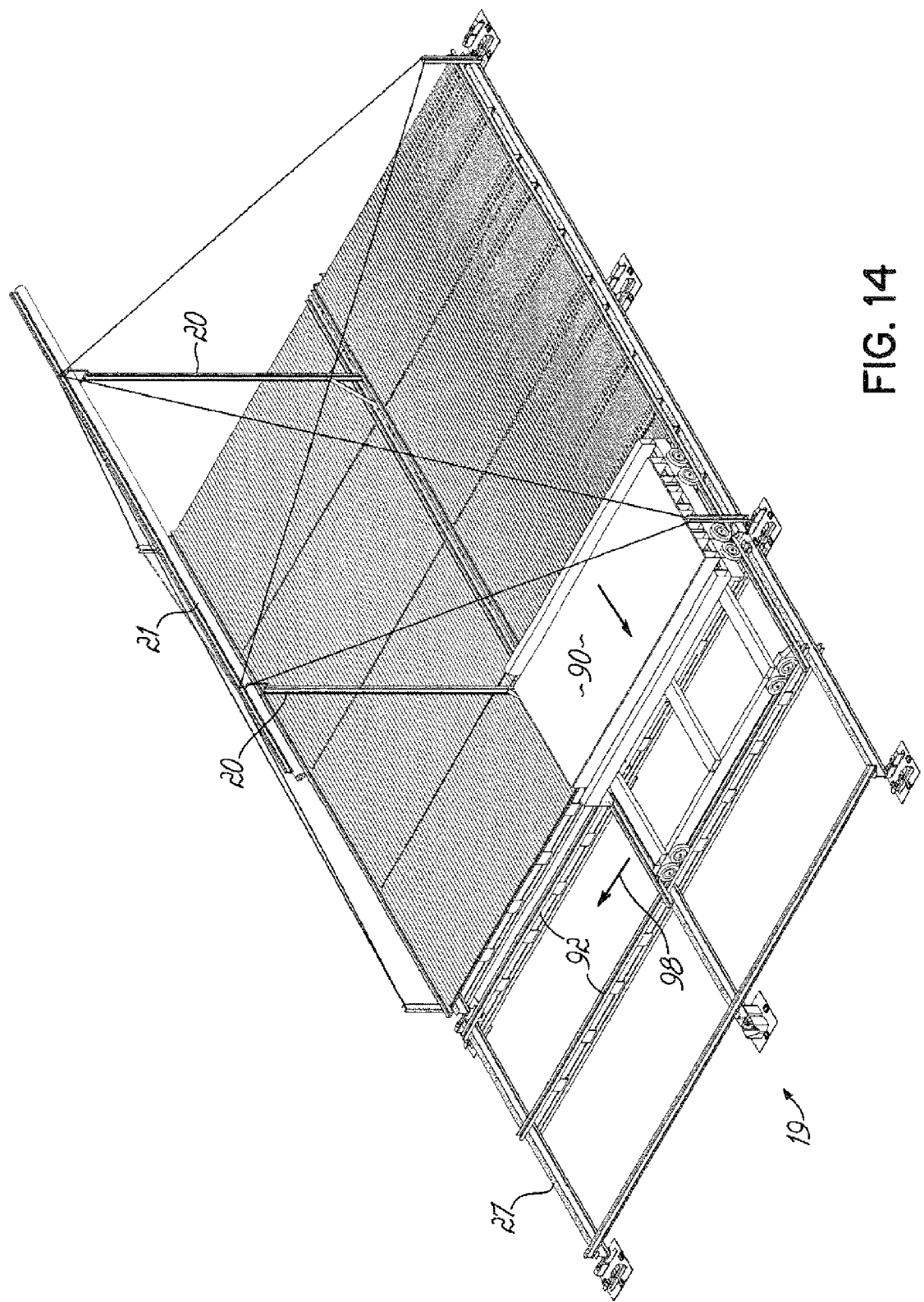
FIG. 14 is a perspective view which shows another aspect of the cart shown in FIG. 13A.

FIG. 14 shows the capability for the cart 90 to move laterally along, or transversely to one of the rows 19 of solar collectors, at the end of the row 19, as shown by directional arrow 97, along a transversely directed track. This enables the cart 90 to service the entire surface area of the cover 16 occupied by the rows 19 solar collector modules. As shown in FIG. 3A, adjacent row 19 access could also be obtained by adding an outer half circular track 94a to connect adjacently located rows. These connector tanks can be removable, for temporary use, to accommodate multiple rows 19. The type of structure can be used for regular servicing of the island 10, for example, for cleaning the panels 22 of the solar collector modules.

One embodiment of the invention contemplates that the outer ring structure, in the case of the water-deployed man-made island, would contain a hydrogen production facility in a hermetically sealed pipe section attached under the outer ring structure. Such a hydrogen production facility could be completely submerged, and run in a way that the electrolysis generator could operate in an evacuated or an inert gas environment, thereby to substantially reduce any potential accident risks. It is also envisaged to use two concentric pipe sections in the construction of such a hydrogen production facility—in other words the electrolysis generator would then be housed in a double-walled structure.

Hydrogen production and distribution facilities are generally not considered to be dangerous; they are not systematically prone to risks of uncontrolled combustion. However, as http://www.eihp.org/public/Reports/Final_Report/Sub-Task_Reports/ST5.2/RISK%20ASSESSMENTS%20OF%20H2-REFUELLING%20STATION_Onsite_%20CONCEPTS.pdf shows, these facilities require frequent maintenance and ongoing surveillance in order to effectively control such risks. An evacuated environment or an environment filled with inert gas would substantially reduce those risks, as hydrogen and oxygen gas sensors would immediately warn about the risk of a leak developing. For regular maintenance every few months, the hydrogen production facility can be shut off and outside air pumped in before the maintenance crews enter the scene.

For the land-based version of the man-made island, the hydrogen generation facility would be constructed at a sufficient distance from the solar island to prevent any potential hazardous exposure.

Steam Storage

To the extent applicable, this detailed description of FIGS. 15-19 uses reference numbers that correspond to similar structures shown in FIGS. 1-14, but in the 500 series.

Figure 15:
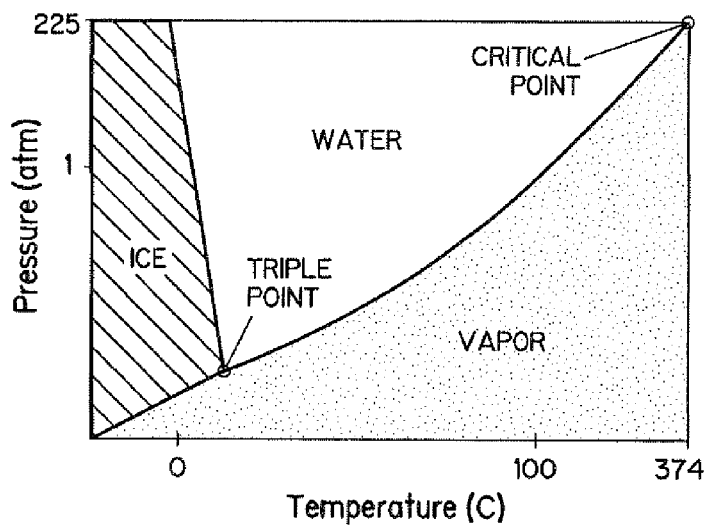
FIG. 15 is a graph showing the phase-change diagram of water.
Figure 16:
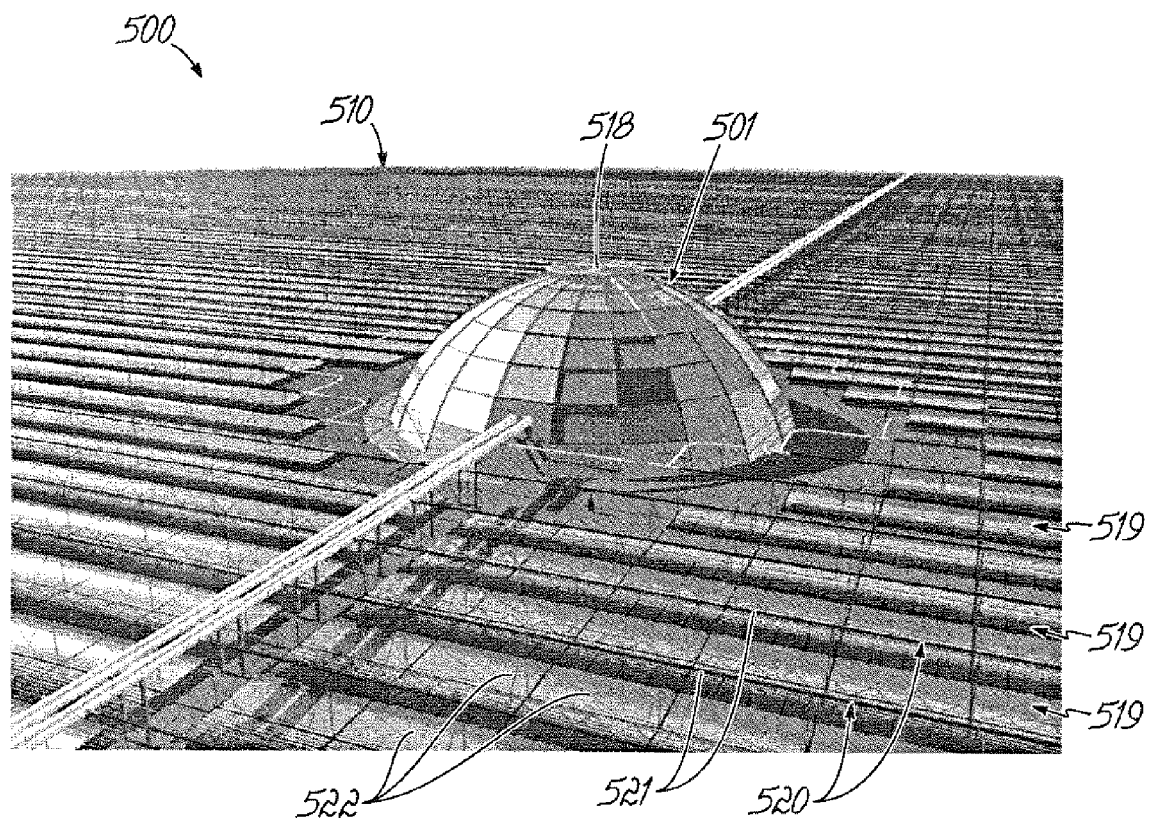
FIG. 16 is a perspective view of a solar island adaptable for use in conjunction with the present invention.

FIG. 15 shows the phase change diagram of water as applicable to this invention. In a preferred embodiment of this invention, applicant's prototype is designed to operate at up to 270 degrees centigrade and up to 60 bars of pressure. At these parameters, the per cubic-meter storage capacity of a Ruths storage device is 300 kWh.

Modern steam turbine design as applicable to fossil fuel powered production of electrical energy is characterized by a desire to increase steam source temperature and pressure in order to get as close as possible to maximum theoretical efficiency of the Clausius Rankine process. Applicant cites the following two recent publications dealing with the parameters of steam turbine design. These publications are incorporated by reference into this application:

Neue Aspekte der aerodynamischen Gestaltung von Niederdruck-Endstufen-Beschaufelungen; Lutz Voelker, Dissertation at the University of Stuttgart, Germany, 2006 http://www.isi.fraunhofer.de/e/publikation/waerme/kapitel03.pdf

This state of the art describes a number of issues that are important when undertaking the design of the inventive solar island incorporating steam storage devices. The temperature and pressure level of the steam source must be substantially maintained. That is, any potential energy losses have to be minimized in order to keep these parameters at a level where the reliable operation of a steam turbine will still be possible.

In one of applicant's preferred embodiments, a solar-thermal energy system 500 uses a steam storage device 501 of the type described, located at the center of a solar island 510 (see FIG. 16), thereby to minimize the distance between the rows 519 of concentrating solar collectors 520, (particularly the heat pipes 521) on the island 510 and the storage tank 501 itself. In this context, the steam storage device 501 corresponds to the hub 18 described with respect to FIG. 1. The size of the steam storage device 501 is maximized by building it in the form of a sphere. The spherical shape minimizes surface area, which in turn minimizes heat dissipation.

Applicant's prototype solar island with a diameter of 87 meters is equipped with a steam storage device having the following design parameters:

Total volume: 185 m3
Maximum pressure: 20 bar
Maximum operating pressure: 16 bar
Minimum operating pressure: 4 bar
Upper temperature limit: 200° C.
Lower temperature limit: 120° C.

As described previously in the state of the art concerning steam turbines, this invention requires the low pressure part of a state-of-the-art steam turbine to be operated as the only power-producing expansion step because primary steam source temperature and pressure levels are not as high as in fossil fuel power stations. As some of the literature cited above shows, this will mean that the efficiency of the Clausius Rankine process realized on the inventive solar island will be in the area of about 20%-30%.

Alternatively, the invention can be realized by replacing the steam turbine with state-of-the-art Spilling engines, steam piston engines, Stirling engines and the like. A person skilled in the art may use the following publication to select alternatives suitable to the particular process parameters found in a specific installation of this invention; Brinkmann, Moderne Dampfmaschinen, Kasseler Symposium Energie-Systemtechnik 2001, Institut für Solare Energieversorgungstechnik Kassel e.V.

Due to the large pressure difference between the inside (up to 60 bar) and the outside (1 bar), the physical stress on the surface of the steam storage device is considerable, corresponding to a weight of up to 600 tons per square meter. As a consequence of this pressure differential, the construction of such a steam storage device tends to be very expensive. For instance, it is believed that steal claddings of up to 4 cm thickness would be needed.

To address this issue, the steam storage device can be submerged at a depth of up to 600 m, where the water pressure is about equal to, i.e., more or less equal to, the pressure inside the spherical storage tank. Thus, outwardly directed forces are offset by the inwardly directed forces. As a result, the sphere can be constructed by using much thinner sheet metal and in a very inexpensive manner.

Figure 17:
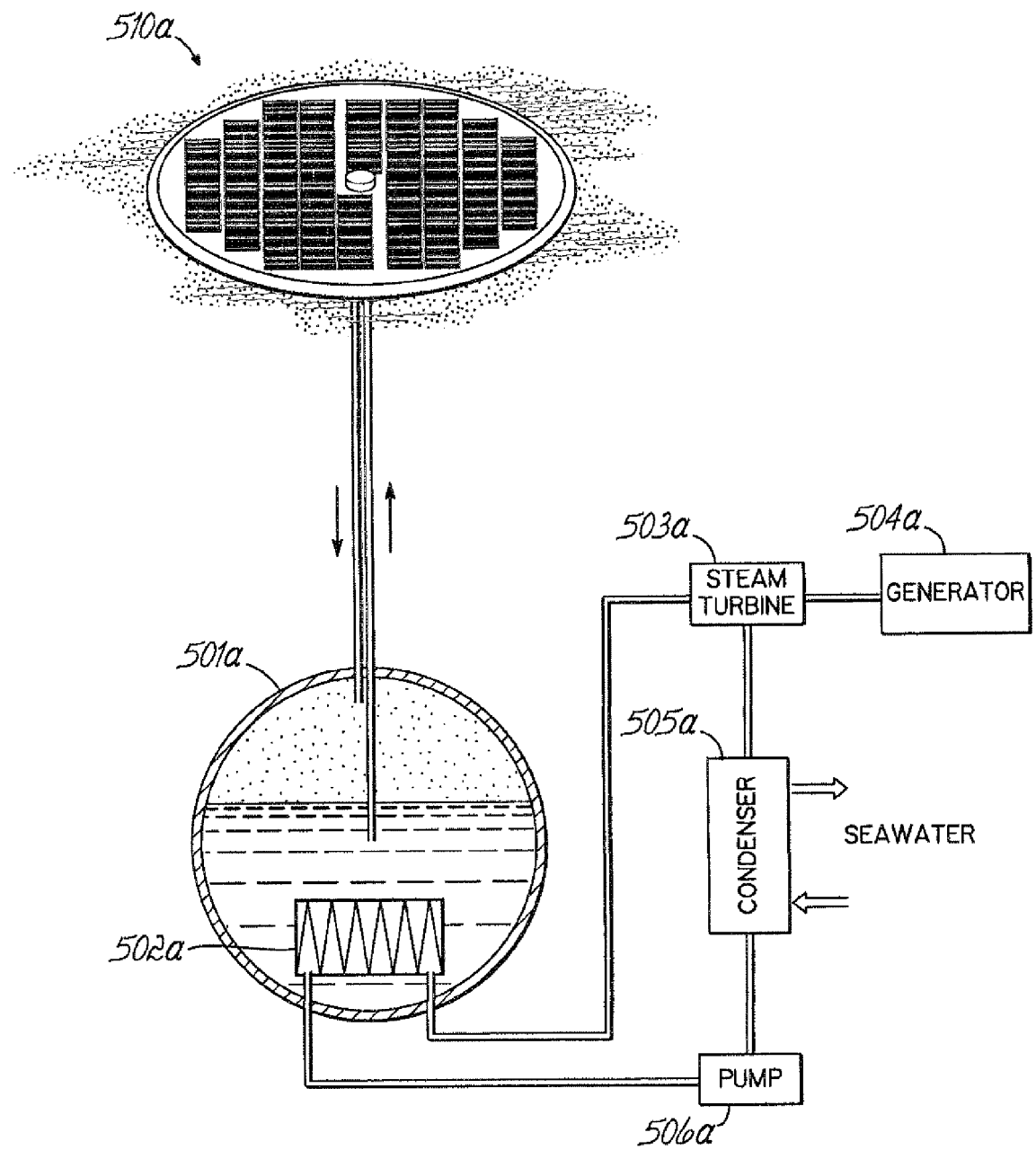
FIG. 17 is a cross-sectional schematic which shows the Clausius Rankine process as implemented via a solar island and a long term steam storage device.

FIG. 17 shows in block diagram form how the Clausius Rankine process can be implemented on another form of the solar island 510a, using a long term steam storage device, i.e. the steam storage tank 501a, that is submerged below sea-level. The tank 501a operatively connects to a heat exchanger 502a which in turn connects to a steam turbine 503a and generator 504a, and also a condenser 505 that produces sweet water, and a pump 506a.

Figure 18:
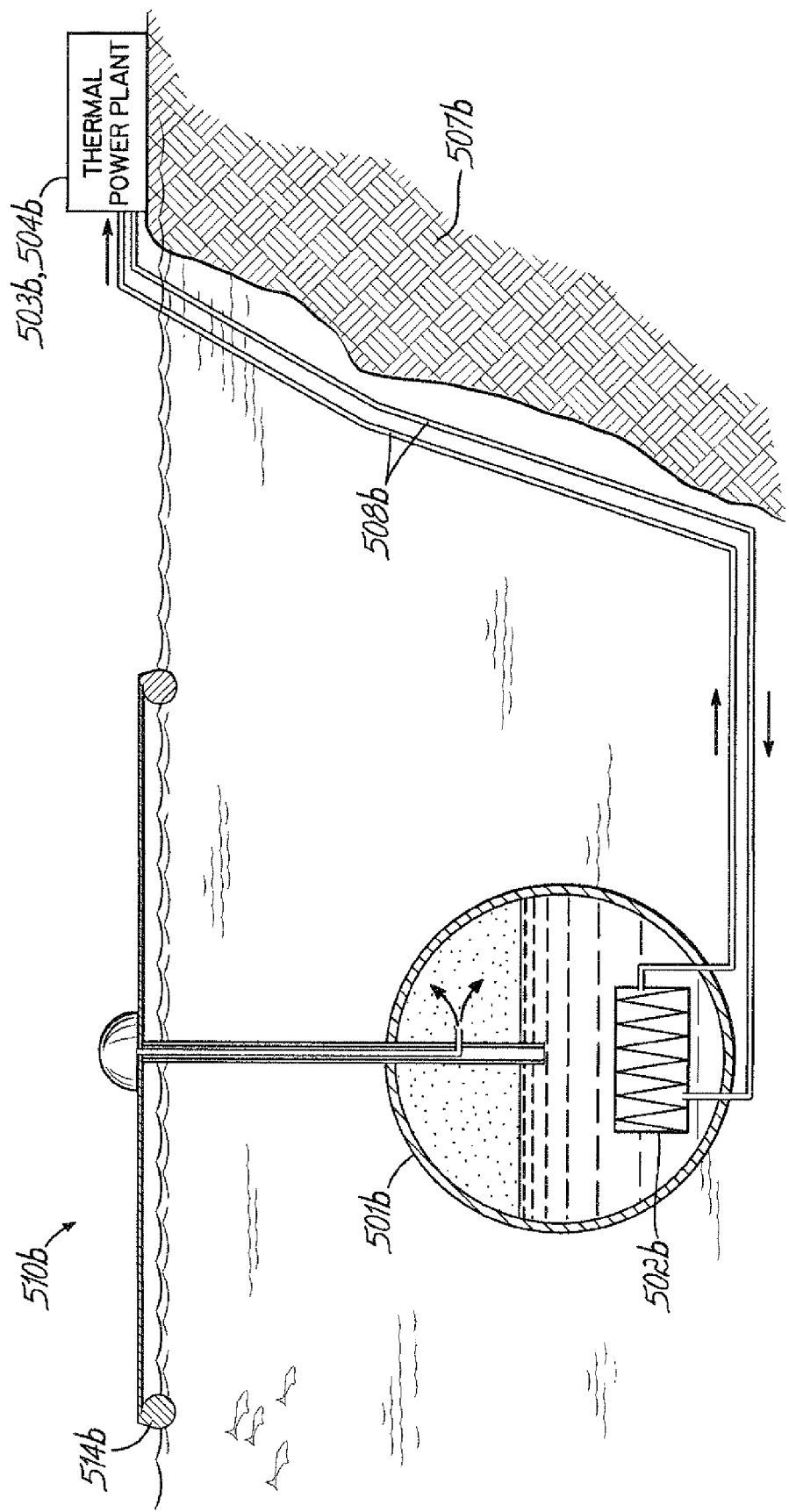
FIG. 18 is a cross-sectional schematic that shows another embodiment of the invention shown in FIG. 17, involving an off-shore version of the artificial island.

FIG. 18 shows another embodiment of the invention, also using another offshore version of the solar island 510b, with a corresponding ring 514b, and the steam storage device 501b again located at a sufficient depth below sea level. In this illustration the steam turbine and generator (not shown) can be installed on the artificial island 510b, to minimize energy losses. Alternatively, as shown in FIG. 18, the thermal power plant 503b/504b can be located on land 507b. However, in the latter case the steam feed and return pipes 508b must be sufficiently insulated so as to warrant a reliable operation of the steam turbine 503b and generator 504b located on land 507b and at some distance from the offshore solar island 510b.

Figure 19:
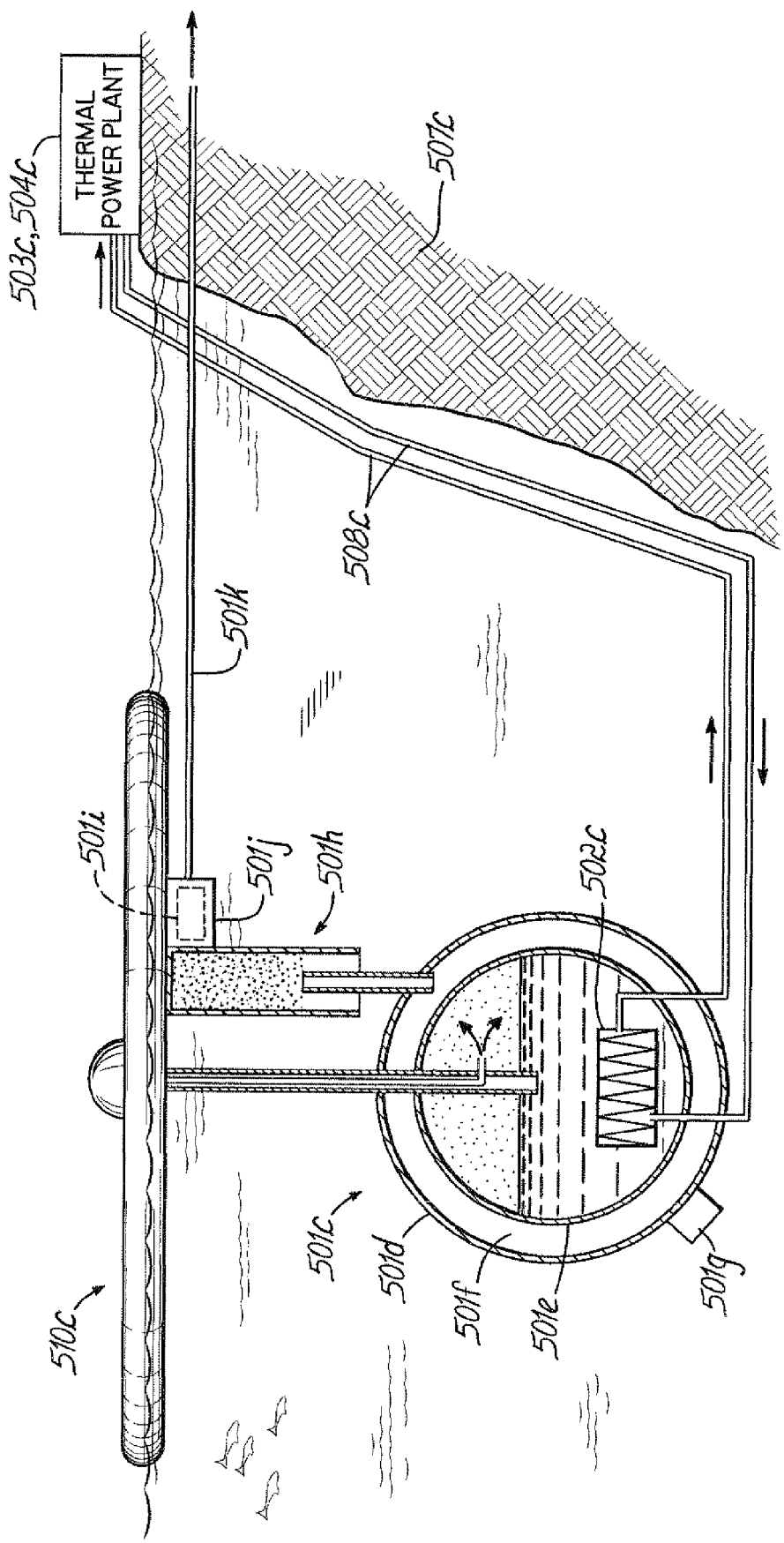
FIG. 19 is a cross-sectional schematic, similar to FIG. 18, but showing a dual-walled below-surface steam storage tank.

FIG. 19 illustrates another embodiment of this invention, where the steam storage device 501c used with an offshore solar island 510c is constructed as a double layer device that is preferably (but not necessarily), placed at sufficient depth in the ocean. More specifically, the device 501c has dual walls, in that a second outer sphere 501d is separated from a first, inner sphere 501e, i.e., the actual steam storage device, by an intermediate volume 501f that forms a watertight concentric room. This intermediate volume 501f can be systematically filled with sea water, for water, by a valve 501g, thereby to achieve two objectives, the production of sweet water and insulation of the steam storage device 501c.

For example, if very hot water is pumped upwards from the intermediate volume 501f, as for example via a tube 501h structure and a pump (not shown), as this water flows upwardly toward the surface of the sea the pressure constantly diminishes (1 bar every 10 m). As a result, the water will start to evaporate, and the tube 501h leading to the surface will start to fill with vapor. Salt will sediment as the water evaporates, but this salt will just sediment downwardly to the depth of the sea. With a condenser 150i located within a watertight compartment 501j near to or at sea or ground level, the condenser 501i can continuously produce sweet water, which is routed to land 507c via pipes 501k.

Also, because the sea water volume stream at the intake is moderate, the temperature of the water in this watertight compartment 501f becomes much higher than the temperature of the ocean. Thus, the dual walled construction of this steam storage device 501c should result in a very effective insulation of the actual steam stored therein.

A person skilled in the art will select appropriate materials and design parameters so as to achieve the necessary corrosion resistance as well as an optimum insulation effect, versus the sweet water volume stream to be obtained.

As indicated above, according to still another embodiment of this invention the stored steam can be used in so called absorption chillers, for air conditioning applications. In many territories around the globe there are sun-belt buildings that must be air-conditioned almost 12 months of the year, due to excessive heat or due to a combination of heat and humidity. Such heat and humidity can not only make life unpleasant, but can also systematically increase the risk of mold-buildup and resulting health issues. As a result, some countries use up to 70 percent of the available electrical power generation capacity for air-conditioning purposes. Bearing in mind that a typical fossil fuel power-plant has an overall efficiency of substantially below 50 percent, and taking the efficiency of a typical electrical air-conditioning unit into account, it becomes clear that the state-of-the-art is wasting significant amounts of primary energy in this part of the world. As a result, this disproportionately high consumption of primary energy is creating a disproportionately high carbon footprint that is contributing to global warming and the resulting widespread environmental deterioration of living conditions in many parts of the world.

GB2241774 and EP1701115 A1 suggest a rotary absorption heat pump for use in refrigeration and air-conditioning applications. Other inventors have similarly attempted to use a heat source instead of electricity to power air-conditioners or refrigeration units. US61119838 describes an absorption cooling machine that does not use any moving parts. The description of this particular invention confirms that it can be employed in association with various energy sources, including but not limited to, any type of passive energy sources such as for example solar energy. Applicant therefore incorporates US61119838 in its entirety into the description of this invention as a potentially preferred embodiment in the context of steam powered air-conditioning applications.

However, those skilled in the art will be able to identify suitable absorption chiller designs that may be used alternatively to obtain the desired effect.

For these reasons one embodiment of this invention is specifically directed to use in the field of air-conditioning. For example, many high-rise apartment buildings in the earth's sunbelt have a flat roof design where the flat roof surface is on the order of 1000 square meters or more. For these buildings, over 90 percent of this surface area is typically available for technical installations such as solar collectors. A simulation of the roof surface area required to provide sufficient central air-conditioning capacity for 40 apartments, with a surface area of between 120-180 square meters each, shows that solar air-conditioning is possible with a solar collector surface area of approximately 2000 square meters. A solar energy system incorporating these aspects of the invention can result in a central air-conditioning system that will supply large buildings reliably during the course of an entire year. In the case that the roof area available, and consequently the solar collector area available, turns out to be insufficient for a system running entirely on solar energy, the additional heat required by absorption chiller devices could be provided by auxiliary furnaces or other appropriate heat sources.

Figure 20:
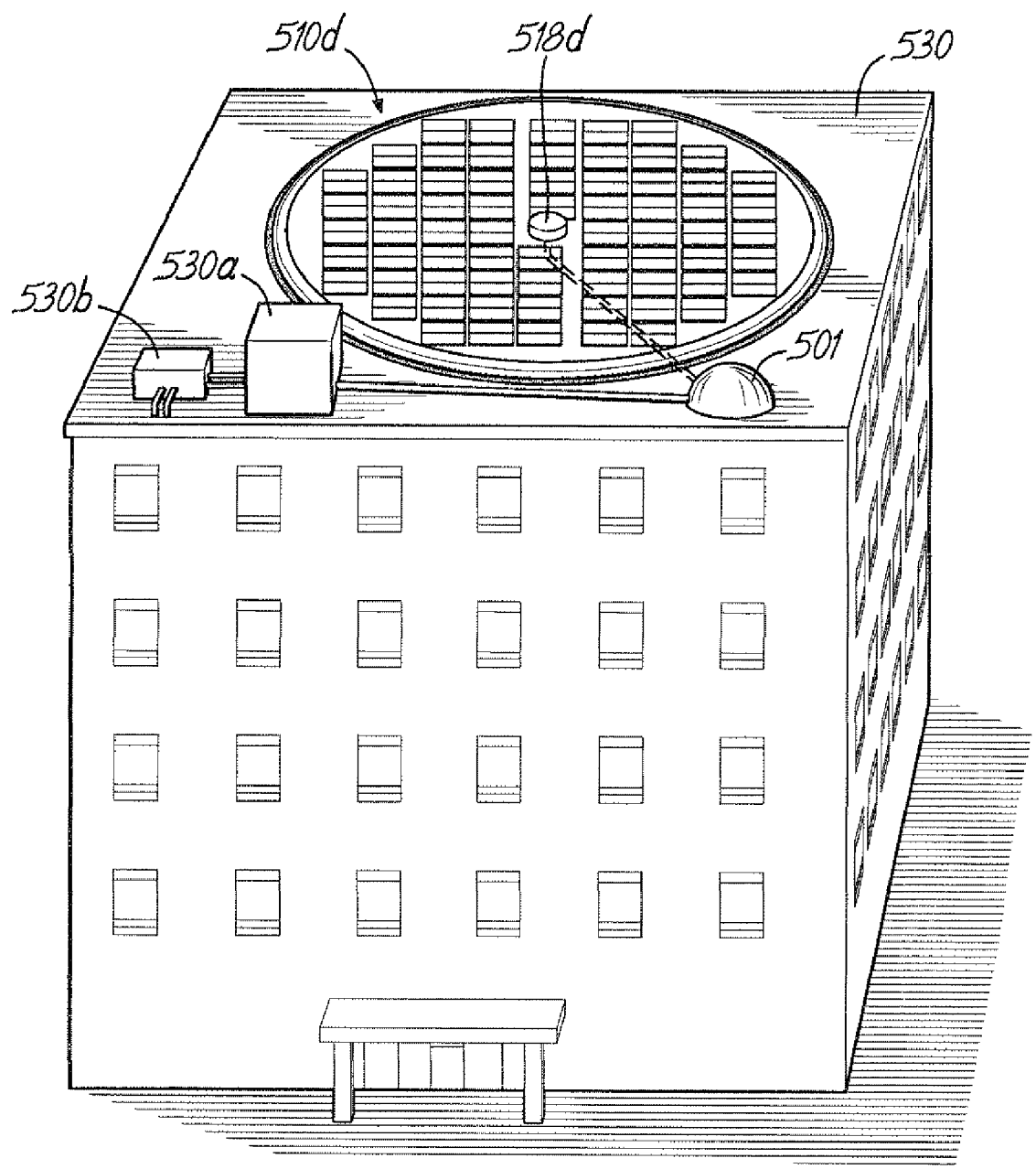
FIG. 20 is a perspective view which shows another aspect of the invention, namely a relatively small man-made solar island located on a building, to drive the air conditioning system for the building.

According to one aspect of this embodiment of this invention, as shown in FIG. 20, a relatively small version of the solar island 510d can be installed on the rooftop of a building 530, with the steam storage tank 501 located adjacent to or even on the roof, and operatively connected to the hub 518 of the solar island 510d. The steam storage tank 501 also connects to an absorption chiller unit 530a, which in turn connects to the central air conditioning unit 530b. This arrangement can be used to provide the primary energy supply for the central air-conditioning system 530b, via absorption chiller devices within the absorption chiller unit 530a. It is believed that an effective collector area of up to 2000 square meters could be achieved with a circular solar island having a diameter of approximately 50 meters.

While this specification describes a number of preferred embodiments and other variations of the invention, those skilled in the art will appreciate that the particular structures shown and described are susceptible to a reasonable degree of modification, and hence, the invention is not limited in scope to the specific details shown and described. Applications wish only to be limited by the broadest reasonable interpretation of the following claims.

I claim:

1. A system for producing solar-thermal energy at a desired temperature and pressure range, comprising:
    a primary energy source operable for use in a Clausius Rankine cycle, including at least one steam storage tank;
    a plurality of solar collectors operatively connected to and located in close proximity to the steam storage tank, so as to minimize heat dissipation;
    wherein the at least one steam storage tank feeds an expansion step in the Clausius Rankine cycle, thereby to achieve reliable operation of the solar-thermal power plant during times of insufficient or no solar radiation received by the solar collectors;
    wherein the plurality of solar collectors are supported on an artificial island, the artificial island being either land based or offshore, the artificial island including an outer ring holding an inner flexible membrane, the membrane being supported by a pressurized fluid contained within a lower volume, the lower volume pressurized by a pump or compressor; and
    wherein the plurality of solar collectors are located on an offshore island and the at least one steam storage tank is located at least a predetermined distance below sea level, such that the at least one steam storage tank is subject to inwardly directly compression force due to the sea water, and the predetermined distance is selected so as to substantially equalize the inwardly directed compression force on the steam storage tank with an outwardly directed force on the tank due to the storage therein of pressurized steam.

2. The system of claim 1 wherein the produced solar-thermal energy has a temperature up to 400 degrees Centigrade at pressure levels of up to 100 bar.

3. The system of claim 1 wherein the predetermined distance below sea-level of the at least one storage tank is up to several hundred meters.

4. The system of claim 1 wherein the shape of the at least one steam storage tank is spherical.

5. The system as recited in claim 1 wherein the at least one steam storage tank has a second outer wall that is watertight and spaced radially outward a desired distance from a first, inner, pressure-loaded wall, whereby the second outer wall and an intermediate volume located between the first and second walls supplies a desired degree of insulation for the first, inner pressure-loaded wall.

6. The system as recited in claim 5 further comprising:
    a valve operatively connected to the second outer wall and adapted to controllably adjust the intake of sea water into the intermediate volume.

7. The system as recited in claim 5, and further comprising:
    a pipe having a first end in fluid communication with the intermediate volume;
    a condensor unit located at sea level and operatively connected to a second end of the pipe, the condenser unit also operatively connected to one or more sweet water storage tanks.

8. The system as recited in claim 1 further comprising:
    at least one absorption chiller device operatively connected to and supplied by the at least one steam storage tank.

9. The system as recited in claim 8 wherein the at least one absorption chiller device that is operatively connected to the at least one steam storage tank is adapted to supply air-conditioning to a building.

10. The system as recited in claim 9 wherein the solar collectors are positioned on the roof of the building, with the at least one steam storage tank located proximate thereto.

11. A solar energy collection system comprising:
    a primary energy source operable for use in a Clausius Rankine cycle, the primary energy source including at least one steam storage tank;
    a platform floating above a body of fluid, the platform including an outer ring structure and a flexible cover that sealingly encloses a top end of the outer ring structure, thereby to define an enclosed volume below the cover;
    a compressor for creating a suitable over-pressure condition within the enclosed volume;
    a plurality of solar radiation collector modules held above the cover, the plurality of solar energy collector modules operable to generate steam during times of sufficient solar radiation, the plurality of solar collector modules being operatively connected to and located in close proximity to the steam storage tank, so as to minimize heat dissipation when the generated steam flows to the steam storage tank;

an upper structure located above the cover and holding the solar radiation collector modules;

the platform being rotatable about a center axis thereof, thereby to enable the orientation of the solar radiation collector modules to be variable and placed at a desired orientation depending on the angular position of the sun; and wherein the at least one steam storage tank feeds an expansion step in the Clausius Rankine cycle, thereby to achieve reliable operation of the solar-thermal power plant during times of insufficient or no solar radiation received by the solar collector modules.

12. The system as recited in claim 11 further comprising:
at least one absorption chiller device operatively connected to and supplied with steam by the at least one steam storage tank.

13. The system as recited in claim 12 wherein the at least one absorption chiller device that is operatively connected to the at least one steam storage tank is adapted to supply air-conditioning to a building, and the solar collectors are positioned on the roof of the building, with the at least one steam storage tank located proximate thereto.

14. A method for producing solar-thermal energy comprising:
generating steam via a plurality of solar collectors during times of sufficient solar radiation, the solar collectors being held above a flexible cover that is part of a platform floating above a body of fluid, the platform including an outer ring structure, and wherein the flexible cover sealingly encloses a top end of the outer ring structure, thereby to define an enclosed volume below the cover, and wherein a compressor creates a suitable over-pressure condition within the enclosed volume, and an upper structure located above the cover holds the solar radiation collector modules, the platform being rotatable about a center axis thereof, thereby to enable the orientation of the solar radiation collectors to be variable and placed at a desired orientation depending on the angular position of the sun; and causing at least some of the generated steam to flow to at least one steam storage tank, the plurality of solar collectors being operatively connected to and located in close proximity to the steam storage tank, so as to minimize heat dissipation as the steam flows thereto, wherein the at least one steam storage tank is operable to feed an expansion step in a Clausius Rankine cycle of a primary energy source that includes the steam storage tank, thereby to achieve reliable operation of a solar-thermal power plant during times of insufficient or no solar radiation received by the solar collectors.

15. The method of claim 14 further comprising:
supplying steam from the at least one steam storage tank to at least one absorption chiller device operatively connected thereto.

16. The method of claim 15 further comprising:
generating air conditioning for a facility via the steam supplied to the at least one absorption chiller device.

17. The method of claim 16 wherein the facility is a building and the solar collectors are positioned on the roof of the building and the at least one steam storage tank is located proximate thereto, with the at least one absorption shore device operatively connected to the at least one storage tank, thereby to facilitate the supplying of air conditioning to the building.

* * * * *